US012663086B2

(12) United States Patent
Breuer et al.

(10) Patent No.: US 12,663,086 B2
(45) Date of Patent: Jun. 23, 2026

(54) SLIDE GATE VALVE, OPERATING METHOD AND USE

(71) Applicant: Z&J Technologies GmbH, Düren (DE)

(72) Inventors: Holger Breuer, Hürtgenwald (DE);
Lisa Cremer, Merzenich (DE)

(73) Assignee: Z & J TECHNOLOGIES GMBH,
Düren (DE)

( * ) Notice: Subject to any disclaimer, the term of this patent is extended or adjusted under 35 U.S.C. 154(b) by 222 days.

(21) Appl. No.: 18/578,455

(22) PCT Filed: Jul. 13, 2022

(86) PCT No.: PCT/EP2022/069551

§ 371 (c)(1),
(2) Date: Jan. 11, 2024

(87) PCT Pub. No.: WO2023/285506

PCT Pub. Date: Jan. 19, 2023

(65) Prior Publication Data

US 2024/0344613 A1    Oct. 17, 2024

(30) Foreign Application Priority Data

Jul. 14, 2021    (DE) ..................... 10 2021 118 135.6
Mar. 15, 2022    (DE) ..................... 10 2022 105 939.1

(51) Int. Cl.
*F16K 3/02*        (2006.01)
*C10B 25/08*       (2006.01)
(Continued)

(52) U.S. Cl.
CPC ............ *F16K 3/0209* (2013.01); *C10B 25/08*
(2013.01); *F16K 3/32* (2013.01); *F16K 3/34*
(2013.01); *F16K 3/186* (2013.01)

(58) Field of Classification Search
CPC .......... F16K 3/0209; F16K 3/34; F16K 3/186;
F16K 3/32; C10B 25/08
See application file for complete search history.

(56) References Cited

U.S. PATENT DOCUMENTS 1,311,332 A      7/1919   Edwards
2,550,984 A  *   5/1951   Ferguson .............. F16K 3/0209
137/244

(Continued)

FOREIGN PATENT DOCUMENTS

CN        108533774 A      9/2018
DE     102016111169 A1    12/2017
(Continued)

*Primary Examiner* — John Bastianelli
(74) *Attorney, Agent, or Firm* — Shumaker, Loop & Kendrick, LLP; James D. Miller

(57) ABSTRACT

A slide gate valve for chemical and/or petrochemical industrial plants, the valve including a valve housing including an inlet port having an exit opening and an outlet port having an entry opening, which correspond with each other when the slide gate valve is in an open position; a blocking device having at least one blocking disc and having a pipe bridge, which is movably arranged between the inlet and outlet ports in order to open and close the valve; and at least one guiding device for guiding flow, wherein the guiding device has at least one guiding element, which is located on an inner wall of the inlet port and reduces the exit opening of the inlet port such that, as the slide gate valve is opened, an opening cross section of the exit opening is enlarged at the moment of an initial, flow ingress into the pipe bridge.

17 Claims, 13 Drawing Sheets

(51) Int. Cl.
    *F16K 3/32*         (2006.01)
    *F16K 3/34*         (2006.01)
    *F16K 3/18*         (2006.01)

(56)               References Cited

U.S. PATENT DOCUMENTS

| | | | |
|---|---|---|---|
| 2,883,148 A | | 4/1959 | Williams |
| 3,780,982 A | | 12/1973 | Kemp |
| 4,177,833 A | * | 12/1979 | Morrison .............. F16K 5/0673 |
| | | | 137/625.12 |
| 4,304,393 A | * | 12/1981 | Malyshev ................. F16K 3/34 |
| | | | 251/210 |
| 4,938,250 A | * | 7/1990 | Peterson .............. B65D 90/587 |
| | | | 55/432 |
| 6,688,324 B2 | * | 2/2004 | Hoang ................... E21B 43/16 |
| | | | 251/327 |
| 7,278,444 B2 | * | 10/2007 | Lucas ..................... F16K 51/02 |
| | | | 251/117 |
| 2012/0319025 A1 | | 12/2012 | Shu |
| 2019/0331234 A1 | * | 10/2019 | Klein ..................... F16K 3/029 |

FOREIGN PATENT DOCUMENTS

| | | | |
|---|---|---|---|
| EP | 0450646 A2 | 10/1991 | |
| EP | 3390871 A1 | 10/2018 | |
| WO | 2013163997 A1 | 11/2013 | |

* cited by examiner

SLIDE GATE VALVE, OPERATING METHOD AND USE

CROSS REFERENCE TO RELATED PATENT APPLICATIONS

This is a U.S. national phase patent application of PCT/EP2022/069551 filed Jul. 13, 2022 which claims the benefit of and priority to German Patent Application No. 10 2022 105 939.1, filed on Mar. 15, 2022 and German Patent Application No. 10 2021 118 135.6, filed on Jul. 14, 2021, the entire contents of each of which are incorporated herein by reference.

TECHNICAL FIELD

The invention pertains to a slide gate valve, a method for operating a slide gate valve and the use of a slide gate valve. A slide gate valve according to the preamble of claim 1 is known, for example, from DE 10 2016 111 169 A1.

BACKGROUND ART

Slide valves that are used, for example, in a coking and/or cracking process generally are subject to stringent requirements regarding their tightness and durability. In addition to liquids or gases, the pressurized fluid being conveyed through such slide valves may also contain solids, for example microparticles such as impurities, dust, soot and residues, e.g., from a coking process or a cracking process. Slide valves of this type frequently are realized in the form of slide gate valves, wherein single-disc gate valves or double-disc gate valves are primarily used. Double-disc gate valves, the basic principle of which can be traced back to a technology developed by the applicant, proved particularly suitable for use in ethylene plants. In such slide gate valves, the valve discs are in the blocking position pushed apart from one another and pressed against the corresponding housing seal seats by means of an intermediately arranged spreading member, specifically a wedge-in-wedge arrangement, upon actuation of a slide rod connected to the spreading member. Such a slide gate valve is known from EP 0 450 646 A2 of the applicant.

It was determined that one particular problem of such slide gate valves is the erosion of the housing seal seats, which is caused by the particles contained in the fluid flowing through the valves. In this case, a punctiform passage, which due to the pressurized fluid results in a fluid flow with very high speed, is formed in the initial phase of the opening process of the slide gate valve. The particles contained in this fluid flow cause significant erosion phenomena on the housing seal seats, particularly on the housing seal seat of the outlet port of the slide valve. The sealing effect therefore deteriorates during the operating time of the slide gate valve such that the maintenance effort is increased and the service life of the slide gate valve is reduced.

As an example, a slide gate valve that was developed for counteracting the erosion of the housing seal seats deflects the fluid flow with the particles contained therein with the aid of a baffle plate in such a way that a direct incident flow against the housing seal seat on the outlet side is prevented, particularly in the initial phase of the opening process, in which the flow speed is very high due to the punctiform opening cross section. Such a slide gate valve is known, for example, from initially cited DE 10 2016 111 169 A1.

However, the slide gate valve known from DE 10 2016 111 169 A1 has the disadvantage that the baffle plate is subjected to significant abrasion by the fluid flow containing particles. Due to the deflection, the baffle plate furthermore causes increased turbulence of the fluid flow in the slide gate valve such that a pressure loss across the slide gate valve is increased and other components of the slide gate valve are subjected to abrasive stress as a result of the flow deflection.

SUMMARY

The invention is based on the objective of disclosing an improved slide gate valve that has a longer service life and an increased erosion resistance. The invention furthermore is based on the objective of disclosing a method for operating a slide gate valve and a use of a slide gate valve.

With respect to the slide gate valve, this objective is attained, according to the invention, as shown and described herein. With respect to the method, the above-defined objective is attained with the subject matter as lshown and described herein. With respect to the use, the above-defined objective is attained with the subject matter as shown and described herein.

The objective specifically is attained with a slide gate valve for chemical and/or petrochemical industrial plants, which comprises:

a valve housing having an inlet port with an exit opening and an outlet port with an entry opening, which correspond with one another in an open position of the slide gate valve;

a blocking device with at least one blocking disc and a pipe bridge that is arranged so as to be movable between the inlet and outlet ports in order to open and close the slide gate valve; and at least one guiding device for guiding the flow.

According to the invention, the guiding device has at least one guiding element that is arranged on an inner wall of the inlet port and reduces the exit opening of the inlet port in such a way that, as the slide gate valve is opened, an opening cross section of the exit opening is enlarged at the moment of an initial, particularly first, flow ingress into the pipe bridge.

The fluid flow comprises process mediums such as vapor and/or hydrocarbons. The inlet port may also be referred to as inlet flange and the outlet port may be referred to as outlet flange.

The invention has the advantage that, as the slide gate valve is opened, the flow speed of an inflowing fluid containing particles is reduced due to the enlarged opening cross section at the moment of the first flow ingress, i.e. at the moment a passage opening is formed from the inlet port into the pipe bridge. In contrast to the slide gate valve known from DE 10 216 111 169 A1, the invention proposes to make available an enlarged opening cross section on the exit opening of the inlet port into the pipe bridge at the moment the valve is opened. As a result, the fluid flows into the pipe bridge such that it is distributed over a comparatively larger opening cross section at the moment the valve is opened. This has the advantage that a nozzle effect of the type occurring in the slide gate valve according to DE 10 2016 111 169 A1 is reduced or even prevented. As a result, a housing seal seat arranged opposite of the opening cross section of the exit opening of the inlet port in the flow direction or a housing seal seat on the outlet side is protected from a punctiform incident flow of the fluid containing particles. Erosion of the housing seal seat therefore is prevented or at least significantly reduced such that the slide gate valve has an improved functional reliability, as well as a longer service life.

The guiding element reduces the exit cross section of the inlet port in such a way that the opening cross section of the exit opening is enlarged at the moment of the first flow ingress into the pipe bridge. In other words, the guiding element protrudes into the exit opening in order to reduce the exit opening. This means that the guiding element delimits the exit opening such that this exit opening is reduced. The guiding element can reduce the exit opening of the inlet port by up to 10 percent, particularly up to 7 percent. It is preferred that the guiding element reduces the exit opening of the inlet port by up to 5 percent. In order to enlarge the opening cross section, the guiding element has a certain shape that preferably is approximated to an inner contour of the pipe bridge. This means that the guiding element on the one hand constricts the exit opening due to its extent transverse to a longitudinal direction of the inlet port and on the other hand enlarges the opening cross section of the exit opening into the pipe bridge in the opening phase due to its shape.

The guiding element preferably is designed in such a way that the opening cross section of the exit opening of the inlet port has a cross-sectional shape that deviates from a punctiform cross section at the moment of the first flow ingress from the inlet port into the pipe bridge. This corresponds, for example, to the enlarged opening cross section. The opening cross section preferably has at least one passage area at the moment of the first flow ingress from the inlet port into the pipe bridge. The opening cross section has a greater extent than a punctiform opening in this case. It is particularly preferred that the opening cross section forms at least one gap at the moment of the first flow ingress from the inlet port into the pipe bridge. The gap preferably is sectionally arcuate. In other words, it is preferred that the gap sectionally has the shape of a segment of a circle. The opening cross section may alternatively or additionally be linear at the moment of the first flow ingress from the inlet port into the pipe bridge. Other geometries of the opening cross section are also possible.

At the position of the exit opening of the inlet port, the guiding element preferably has a shape that is adapted to an inner contour, particularly an inner circumference, of the pipe bridge in order to enlarge the opening cross section.

The opening cross section is delimited by a contour of the inner wall of the inlet port, the guiding element and the pipe bridge, particularly an inner contour of the pipe bridge, at the moment of and during the entire opening process. In other words, a contour of the inner wall of the inlet port, the guiding element and the pipe bridge define the size of the opening cross section of the exit opening of the inlet port when the slide gate valve is opened and closed.

The shape of the guiding element, which preferably is approximated to the inner contour of the pipe bridge, is one option for enlarging the opening cross section of the exit opening of the inlet port. Another option for enlarging the opening cross section is designing an outer contour of the guiding element with a straight outer edge. The outer edge preferably extends transverse to the opening and closing direction of the slide gate valve. The shape of the guiding element, specifically the outer edge of the guiding element, generally deviates from the shape of the inner wall of the inlet port.

The shape of the guiding element, specifically the outer edge of the guiding element, deviates from the shape of the inner wall of the inlet port in such a way that a nozzle-shaped opening cross section of the exit opening of the inlet port of the slide gate valve, which in the prior art is formed when the pipe bridge and the inlet port overlap due to the respectively opposite curvatures of their inner walls, is prevented or at least neutralized faster than in the prior art. A nozzle-shaped, punctiform opening cross section is prevented, for example, if the guiding element, specifically the outer edge of the guiding element, and the pipe bridge have identical curvature radii that lead to a linear opening cross section. A nozzle-shaped, punctiform opening cross section is neutralized faster than in the prior art, for example, if the guiding element, specifically the outer edge of the guiding element, is designed straight because the opening cross section is in this case enlarged faster than in the prior art.

An initial flow ingress generally is delayed in time in comparison with the prior art. Due to this time delay, the opening cross section can be enlarged in the initial phase of the opening process until an effective passage of the flow begins without the occurrence of the damaging nozzle effect. The nozzle effect is at least reduced.

The time delay in opening the inlet port has the additional effect that the outlet port is opened to a greater extent than the inlet port at the same point in time. The opening cross section of the outlet port therefore is larger than the opening cross section of the inlet port at the same point in time.

This means that the invention has two effects. At the inlet port, the guiding element respectively prevents the formation of a nozzle-shaped "punctiform" opening or enlarges the opening faster than in the prior art. At the outlet port, the invention causes the opening cross section of the outlet port to be larger than the opening cross section of the inlet port at the same point in time because the guiding element delays opening of the inlet port. The outlet port is opened to a greater extent than the inlet port at the same point in time.

In both instances, i.e. with a straight or curved outer edge, or generally in the context of the invention, the guiding element, specifically the outer edge of the guiding element, is arranged so close to the plane defined by the exit opening of the inlet port that the guiding element at least temporarily shields the exit opening against the passage of the fluid flow as the slide gate valve is opened. This prevents a fluid flow from immediately passing through the exit opening and thereby ruining the inventive effect as the valve is opened. The guiding element does not necessarily have to directly border on the plane or contact the blocking device in order to achieve the shielding effect. A slight distance between the guiding element, specifically its outer edge, and the plane is possible as long as no significant fluid flow, e.g. due to turbulences, is thereby able to flow through the slide gate valve past the guiding element before the inner wall of the pipe bridge has passed the guiding element, specifically its outer edge, as the valve is opened.

In other words, the guiding element forms a seal relative to the blocking device in such a way that the fluid flow through the slide gate valve is delayed as the valve is opened. The guiding element has a temporary blocking function as the slide gate valve is opened.

The guiding element forms a stationary or fixed blocking member that acts temporarily as the valve is opened. The guiding element is arranged stationarily on the inlet port. The blocking device on the other hand is movable.

The blocking device is arranged so as to be movable between the inlet port and the outlet port. The blocking device preferably is arranged so as to be linearly movable between the inlet port and the outlet port. It is preferred that the blocking device specifically can be displaced between the open position and a closed position of the slide gate valve.

In the open position, the inlet port and the outlet port are connected to one another by the pipe bridge. In the closed position, the inlet port and the outlet port are blocked off from one another by the at least one blocking disc.

The blocking device is moved, preferably by a slide rod, during an opening or closing process of the slide gate valve. The displacement path between the open position and the closed position corresponds to a total stroke of the blocking device, particularly the slide rod. The blocking device is arranged in a minimal stroke position in the closed position of the valve and in a maximal stroke position in the open position of the valve. In other words, the blocking device has a stroke of 0 percent of the total stroke in the closed position and a stroke of 100 percent of the total stroke in the open position.

The stroke range, in which the opening cross section of the exit opening of the inlet port influences an applied process pressure, may lie between 0 percent and up to 35 percent of the total stroke. This stroke range corresponds to the opening phase of the slide gate valve. The opening phase, which includes the moment of the first flow ingress into the pipe bridge through the exit opening of the inlet port, may take place at a stroke of the blocking device that lies between 22 percent and 35 percent, particularly between 22 percent and 30 percent, of the total stroke. The moment of the first flow ingress into the pipe bridge through the exit opening of the inlet port preferably occurs at a stroke of the blocking device that lies between 23 percent and 28 percent, particularly between 24 percent and 26 percent, of the total stroke. It is particularly preferred that the moment of the first flow ingress into the pipe bridge through the exit opening of the inlet port occurs at a stroke of 25 percent of the total stroke.

The exit opening of the inlet port and the entry opening of the outlet port preferably border on the blocking device. The housing seal seats preferably are located at the position of the exit opening and the entry opening in order to interact with the blocking device for sealing purposes.

It is particularly preferred that the slide gate valve is realized in the form of a double-disc gate valve. In this case, the blocking device preferably has two blocking discs that are arranged concentrically in a disc basket. It is preferred that the blocking discs and the pipe bridge respectively abut on the housing seal seats in the closed position and in the open position.

Preferred embodiments of the invention are disclosed in the dependent claims.

In a preferred embodiment, the guiding element is designed in such a way that, as the slide gate valve is opened, the exit opening of the inlet port can be unblocked or is unblocked with a time delay in relation to the entry opening of the outlet port. In this case, the pipe bridge initially overlaps with the entry opening of the outlet port and subsequently with the exit opening of the inlet port during an opening process. Consequently, an opening cross section of the entry opening of the outlet port into the pipe bridge is initially unblocked and the opening cross section of the exit opening of the inlet port is subsequently unblocked due to the guiding element.

The exit opening of the inlet port and the entry opening of the outlet port preferably are arranged concentrically. Due to the delayed unblocking of the exit opening of the inlet port, the available opening cross section of the entry opening of the outlet port is enlarged in relation to the exit opening at the moment of the first flow ingress into the pipe bridge. This has the advantage that a fluid flow from the housing seal seat on the outlet port enters the pipe bridge in an offset manner such that a direct incident flow against the housing seal seat is prevented. The erosion of the housing seal seat is thereby at least reduced and the service life of the slide gate valve is extended.

In a preferred embodiment, the guiding element is adapted in such a way that the opening cross section forms at least one gap between the pipe bridge and the inlet port at the moment of the first flow ingress from the inlet port into the pipe bridge. The gap and the blocking disc preferably extend in one plane. The gap forms an enlarged opening cross section in comparison with the conventional puncti-form opening cross section.

The guiding element preferably is adapted in such a way that the gap is sectionally arcuate and sectionally linear. The shape of the gap therefore can combine different geometries. This is the case, for example, with a straight outer edge of the guiding element. A first longitudinal side of the gap is straight or linear and the opposite, second longitudinal side of the gap is arcuate in this case. The straight longitudinal side is defined by the outer edge of the guiding element and the arcuate, curved longitudinal side is defined by the inner wall of the pipe bridge. It was surprisingly determined that such a shape of the gap is particularly advantageous in terms of fluidics.

It is not necessary that the outer edge of the guiding element lies in the plane of the exit opening of the inlet port. The distance between the outer edge and the plane of the exit opening is chosen in such a way that an inadvertent passage of fluid in the initial phase of the opening process is prevented or at least significantly reduced and a shielding effect is achieved.

At the exit opening of the inlet port, the guiding element has at least one outer contour that extends transverse to the opening and closing direction of the slide gate valve. The transverse extent of the outer contour causes a portion of the exit opening of the inlet port to be shielded against the fluid flow. In this case, the outer contour has the aforementioned straight outer edge, particularly a straight outer edge that is arranged horizontally. The outer contour may alternatively have a curved outer edge.

In another preferred embodiment, the guiding element has at the exit opening of the inlet port at least one outer contour that corresponds to an inner contour of a passageway of the pipe bridge. In other words, the guiding element has at the position of the exit opening of the inlet port at least one outer contour that in terms of its shape corresponds to an inner contour of a passageway of the pipe bridge. The outer contour of the guiding element and the inner contour of the passageway preferably border on one another in a longitu-dinal direction of the inlet port. The inner contour of the passageway of the pipe bridge can be moved relative to the outer contour of the guiding element transverse to the longitudinal direction of the inlet port. The outer contour of the guiding element preferably is an outer edge that is arranged at the position of the exit opening of the inlet port, particularly with respect to the longitudinal direction. The inner contour of the passageway of the pipe bridge prefer-ably forms part of an inner circumference of the passageway. The passageway preferably is a continuous opening through the pipe bridge and at least in the open position produces a fluidic connection between the inlet port and the outlet port.

An elongate opening cross section, through which the fluid flows into the passageway in a distributed manner, is unblocked during an opening process at the moment of the first flow ingress into the passageway of the pipe bridge. This reduces the flow speed of the fluid flow and therefore the erosion effect, e.g. on the housing seal seat on the outlet side. These remarks also apply to the embodiment with a straight outer edge.

The outer contour of the guiding element and the inner contour of the passageway of the pipe bridge preferably have an identical curvature radius, particularly the same curvature radius.

The outer contour of the guiding element may be designed in the shape of a circular arc. The inner contour of the passageway of the pipe bridge may be circular. The outer contour of the guiding element preferably is convex. It is possible that the outer contour of the guiding element sectionally has the same curvature radius as the inner contour of the passageway. The passageway of the pipe bridge preferably is cylindrical. The passageway preferably forms part of a compensator unit of the pipe bridge. The curved design of the outer and inner contours has the advantage that the opening cross section of the exit opening of the inlet port is linear or gap-shaped at the moment of the first flow ingress into the passageway of the pipe bridge such that a comparatively calmer inflow of the fluid is realized. This also applies to the embodiment with a straight outer edge.

It is furthermore preferred that the outer contour extends inward transverse to the longitudinal direction of the inlet port starting from the inner wall. In other words, the outer contour of the guiding element extends from the inner wall of the inlet port into the interior of the inlet port transverse to the longitudinal direction and thereby reduces the exit opening. The outer contour of the guiding element is arranged at the position of the exit opening with respect to the longitudinal direction of the inlet port. The outer contour of the guiding element preferably has two ends that are in contact with the inner wall. Furthermore, the outer contour of the guiding element preferably has at least one vertex that lies in the interior of the inlet port transverse to the longitudinal direction. In other words, the vertex respectively is offset inward or spaced apart from the inner wall of the inlet port transverse to the longitudinal direction. This embodiment represents a simple solution for reducing the exit opening on the one hand and for enlarging the opening cross section at the moment of the first flow ingress on the other hand.

In a preferred embodiment, the guiding element has a surface that is designed straight and protrudes from the inner wall into the inlet port with increasing distance along the flow direction. The guiding element preferably is a laminar element that extends over a region of the inner wall of the inlet port. Due to the increasing distance, a continuous reduction of the effective flow cross section of the inlet port is achieved in order to enlarge the opening cross section of the exit opening of the inlet port on the one hand and to deflect the fluid flow with the least turbulences possible on the other hand such that the exit opening of the inlet port is temporarily shielded in the initial phase of the opening process. An impingement of the fluid flow in the sense of a baffle plate and strong turbulences of the fluid created thereby are largely prevented.

The surface may alternatively bulge into the interior of the inlet port starting from the inner wall. The guiding element preferably has a hump-like shape. The guiding element preferably is a laminar element that extends over a region of the inner wall of the inlet port. The surface of the guiding element preferably has a convex curvature that extends into the interior of the inlet port. The bulge of the surface preferably extends transverse to and/or in the longitudinal direction of the inlet port.

The surface of the guiding element preferably faces the interior of the inlet port. The guiding element preferably ends flush with the surface on the inner wall of the inlet port. The guiding element may be made of sheet metal. In this case, a cavity may be provided between the guiding element and the inner wall of the inlet port. The guiding element may alternatively be made of a solid material that fills out a space between the surface of the guiding element and the inner wall of the inlet port. The bulging surface advantageously has a flow-optimized shape such that a pressure loss of the slide gate valve is kept to a minimum. In the slide gate valve according to DE 10 2016 111 169 A1, in contrast, an increased dynamic pressure is built up by the impinging fluid flow, particularly in the open position of the slide gate valve. No increased pressure is built up on the guiding element in the open state of the described embodiment of the inventive slide gate valve. The bulging shape furthermore has the advantage that, in contrast to the baffle plate used in the prior art, no impingement of the fluid flow takes place such that abrasion of the guiding element is reduced. The same explanations also apply to a guiding element with a straight surface that ascends in the flow direction, i.e. protrudes into the interior of the inlet port in a continuously increasing manner in the flow direction.

The guiding element preferably is designed such that it ascends toward the exit opening of the inlet port in the flow direction. In other words, the guiding element forms an ascending ramp from the inner wall toward the exit opening of the inlet port in the flow direction. The guiding element may extend such that it ascends toward the exit opening continuously, particularly uniformly. It is furthermore preferred that the guiding element extends at least partially in a longitudinal direction of the inlet port and ends at the exit opening of the inlet port. In other words, the guiding element has an end that is arranged at the position of the exit opening with respect to the longitudinal direction. The outer contour of the guiding element preferably is formed on the end. The guiding element may extend sectionally or over the entire length of the inlet port. This embodiment has fluidic advantages. In this case, the fluid flow is conveyed toward the exit opening continuously, i.e. free of any baffle edge or baffle step. These remarks apply to the guiding element with a straight surface, as well as to the guiding element with a bulging surface.

The guiding element may have a triangular cross section or form a triangular cross section together with the inner wall. This embodiment is intended for use in connection with a guiding element with a straight surface, which continuously protrudes farther into the interior of the inlet port in the flow direction. The guiding element may have a triangular cross section as it is the case, for example, with a massive guiding element. If the guiding element is made of sheet metal, the sheet metal and the inner wall jointly form the triangular cross section.

The triangular cross section may extend along the width of the guiding element, particularly its entire width. It goes without saying that the size of the triangular cross section varies in the circumferential direction of the inlet port. If the triangular cross section extends along the width of the guiding element, particularly its entire width, it is ensured that the guiding element causes a gradual deflection of the fluid flow in order to shield the exit opening.

A drainage gap preferably is formed between the guiding element and the inner wall of the inlet port. This gap allows a controlled drainage of liquid such as condensate.

In a preferred embodiment, the inlet port and the outlet port respectively have a seal seat for the at least one blocking disc. The inlet port and the outlet port preferably have a respective seal seat for a total of two blocking discs in order to produce a tight connection in the closed position. In this case, the guiding element, particularly the outer contour, is at least sectionally offset inward in relation to the seal seat of the outlet port transverse to the longitudinal direction. This has the advantage that the opening cross section of the exit opening of the inlet port is unblocked in a delayed manner in relation to an opening cross section of the entry opening of the outlet port as the slide gate valve is opened. In this way, a direct incident flow against the seal seat of the outlet port is prevented such that the erosion of the seal seat is at least reduced or entirely prevented.

In one embodiment, an opening cross section of the entry opening of the outlet port is larger than the opening cross section of the exit opening of the inlet port as the slide gate valve is opened and/or in the open position of the slide gate valve. A ratio between the opening cross section of the exit opening of the inlet port and the opening cross section of the entry opening of the outlet port may amount to at least 1 to 2 ("1:2"). A greater ratio between the opening cross sections than 1 to 2 is possible. The cited ratio refers to the areas of the opening cross sections.

The guiding device may have an additional guiding element that is arranged between the blocking disc and the pipe bridge in a direction of displacement of the blocking device. In this case, the additional guiding element forms a flow channel that extends transverse to the direction of displacement and connects the inlet port to the outlet port at least when the slide gate valve is opened. With respect to the advantages of such an additional guiding element, we refer to the advantages elucidated in connection with the slide gate valve described below.

According to coordinate claim 17, the invention pertains to a slide gate valve, particularly a double-disc gate valve, for chemical and/or petrochemical industrial plants, which comprises:

a valve housing having an inlet port with an exit opening and an outlet port with an entry opening, which correspond with one another in an open position of the slide gate valve;

a blocking device with at least one blocking disc, particularly two blocking discs, and a pipe bridge that is arranged so as to be movable between the inlet and outlet ports in order to open and close the slide gate valve; and at least one guiding device for guiding the flow.

The guiding device has at least one guiding element that is arranged between the blocking disc and the pipe bridge in a direction of displacement of the blocking device, wherein the guiding element forms a flow channel that extends transverse to the direction of displacement and connects the inlet port to the outlet port at least when the slide gate valve is opened.

This has the advantage that by the flow channel prior to unblocking a passage from the exit opening of the inlet port into the pipe bridge as the slide gate valve is opened. This means that the fluid pressure on the inlet side is already reduced in advance and the dirt deposited on the inlet side is at least partially removed through the flow channel. As a result, the fluid flow through the passageway of the pipe bridge contains fewer particles such that the housing seal seat on the outlet side is protected. The erosion resistance and the service life of the slide gate valve are thereby increased.

The slide gate valve preferably has at least two guiding elements that respectively form a flow channel through the blocking device transverse to the direction of displacement. In a preferred embodiment, the guiding element is integrated into the blocking device, wherein the flow channel extends through the entire blocking device transverse to the direction of displacement. The guiding element preferably is formed by at least one pipe section.

According to one embodiment, the invention pertains to a method for operating a slide gate valve for chemical and/or petrochemical industrial plants, particularly a slide gate valve of the above-described type, wherein the slide gate valve comprises a valve housing having an inlet port and an outlet port and a blocking device, which is displaced in the valve housing between an open position and a closed position in order to open and close the slide gate valve. The blocking device has at least one blocking disc and a pipe bridge with a passageway, wherein said pipe bridge is in the open position arranged in such a way that the inlet port with an exit opening and the outlet port with an entry opening are connected to one another by the passageway of the pipe bridge. In the closed position, the blocking device is arranged in such a way that the inlet port and the outlet port are blocked off from one another by the blocking disc. The slide gate valve has at least one guiding device with at least one guiding element for guiding the flow, wherein said guiding element is arranged on an inner wall of the inlet port and reduces the exit opening of the inlet port. When the blocking device is displaced from the closed position into the open position, an enlarged and, in particular, gap-shaped opening cross section of the exit opening of the inlet port is unblocked at the moment of an initial, particularly first, flow ingress into the passageway of the pipe bridge, wherein said gap-shaped opening cross section is defined by the guiding element and the passageway of the pipe bridge.

In a preferred embodiment of the inventive method, the opening cross section of the exit opening of the inlet port is unblocked linearly, particularly uniformly, over the entire displacement path of the blocking device as the slide gate valve is opened.

According to another embodiment, the invention pertains to a method for operating a slide gate valve for chemical and/or petrochemical industrial plants, particularly a slide gate valve of the above-described type, wherein the slide gate valve comprises a valve housing having an inlet port and an outlet port and a blocking device, which is displaced in the valve housing between an open position and a closed position in order to open and close the slide gate valve. The blocking device has at least one blocking disc and a pipe bridge with a passageway, wherein said pipe bridge is in the open position arranged in such a way that the inlet port with an exit opening and the outlet port with an entry opening are connected to one another by the passageway of the pipe bridge. In the closed position, the blocking device is arranged in such a way that the inlet port and the outlet port are blocked off from one another by the blocking disc. The slide gate valve has at least one guiding device with at least one guiding element for guiding the flow, wherein said guiding element is arranged between the blocking disc and the pipe bridge in a direction of displacement of the blocking device. The guiding element forms a flow channel that extends transverse to the direction of displacement and, when the blocking device is displaced from the closed position into the open position, connects the inlet port to the outlet port before the passageway of the pipe bridge unblocks an opening cross section of the exit opening of the inlet port.

With respect to the advantages of the methods for operating the slide gate valve, we refer to the advantages elucidated in connection with the slide gate valves. Furthermore, the methods may alternatively or additionally comprise individual characteristics or a combination of multiple characteristics cited above with reference to the slide gate valve.

According to the invention, a slide gate valve of the above-described type is used in a cracking process and/or a coking process.

DESCRIPTION OF DRAWINGS

The invention is described in greater detail below with reference to the attached drawings. The embodiments illustrated in the drawings represent exemplary designs of the inventive slide gate valve.

In these drawings.

DESCRIPTION OF AN EMBODIMENT

Figure 1:
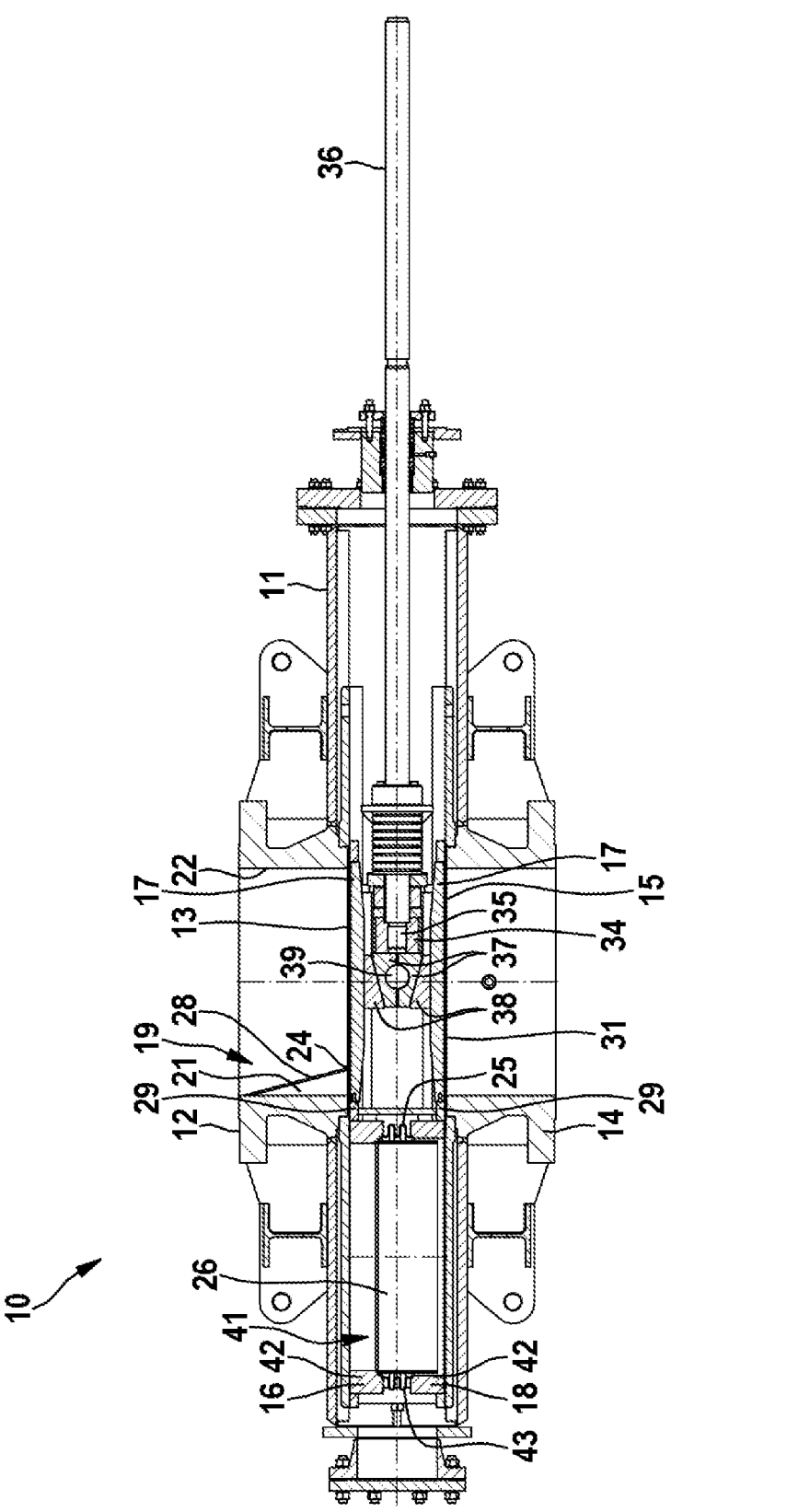
FIG. 1 shows a longitudinal section through a slide gate valve according to a preferred exemplary embodiment of the invention, wherein a blocking device of the slide gate valve is in a closed position.
Figure 2:
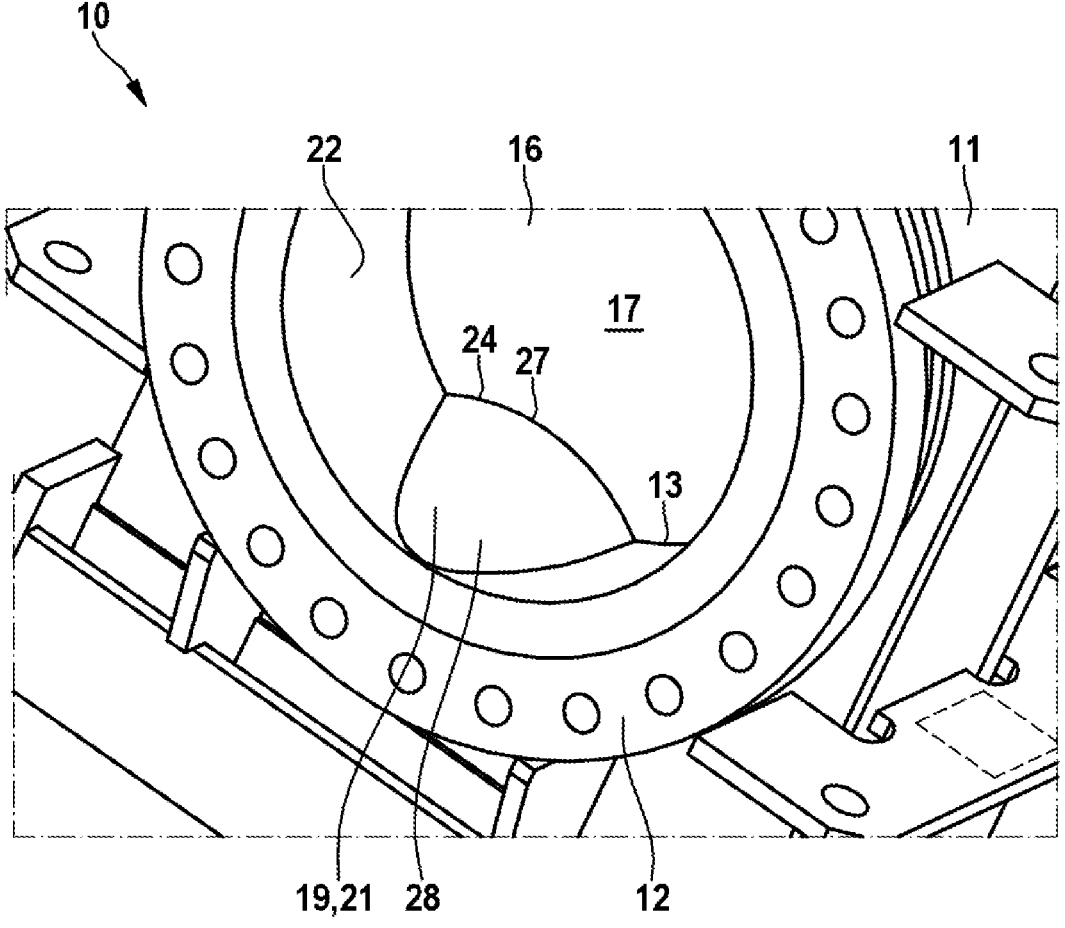
FIG. 2 shows a perspective detail of an inlet port with a guiding device of the slide gate valve according to FIG. 1.

Identical and identically acting components are identified by the same reference symbols in the following description.

FIGS. 1 to 7 show a slide gate valve 10 according to a preferred exemplary embodiment of the invention, wherein the slide gate valve 10 is a double-disc gate valve.

The slide gate valve 10 has a valve housing 11 that encloses the components located in the valve housing 11 in a fluid-tight manner. The valve housing 11 has an inlet port 12 and an outlet port 14. The inlet and outlet ports 12, 14 are respectively realized in the form of pipe sockets. The inlet and outlet ports 12, 14 are in the installed state flanged to corresponding (not-shown) lines such as a transfer line or a decoking line.

The inlet port 12 has an exit opening 13 and the outlet port 14 has an entry opening 15, which correspond with one another in an open position of the slide gate valve 10. The inlet and outlet ports 12, 14 lie on a common longitudinal axis.

The slide gate valve 10 furthermore has a blocking device 16 that comprises two blocking discs 17 and a pipe bridge 18. The blocking discs 17 are placed into a disc basket 34. The blocking discs 17 are arranged concentrically and parallel to one another and block the inlet and outlet ports 12, 14 in a closed position. The blocking discs 17 are placed into the disc basket 34 loosely such that they are movable in the axial direction, i.e. perpendicular to the surface of the blocking discs 17. In other words, the blocking device 16 can be displaced transverse to the longitudinal axis of the ports 12, 14. This is used for pressing the blocking discs 17 against the housing seal seats 29 provided on the valve housing 11 in the closed position. To this end, a spreading member 35 is arranged between the two blocking discs 17 and connected to a slide rod 36. The slide rod 36 is mounted in the valve housing 11 in a fluid-tight manner and can be moved in the longitudinal direction by a (not-shown) drive. The spreading member 35 has an inner wedge 37 that is arranged in an outer wedge 38 on the inner side of the blocking discs 17. A centering ball 39 is arranged between jaws of the inner wedge 37 in order to center the spreading member 35.

The pipe bridge 18 is rigidly connected to the disc basket 34. In other words, the pipe bridge 18 is arranged on the disc basket 34 on a side that lies opposite of the slide rod 36. The pipe bridge 18 has a passageway 26 that is aligned with the inlet and outlet ports 12, 14 in the open position. The pipe bridge 18 is connected to the disc basket 34 in such a way that it can be moved into the open or closed position together with the disc basket 34 by actuating the slide rod 36. To this end, the disc basket 34 and the pipe bridge 18 are moved between two parallel guide discs.

The pipe bridge 18 has a compensator unit 41 that comprises the passageway 26. The compensator unit 41 has two sealing rings 42 that are arranged concentrically and spaced apart from one another in the axial direction. A bellows 43 is arranged between the two sealing rings 42. This bellows is realized with multiple corrugations in the present exemplary embodiment. Single-corrugation bellows are likewise possible, particularly for smaller nominal widths.

When the slide rod 36 is actuated, the inner wedge 37 is moved into the outer wedge 38 such that the two blocking discs 17 are spread apart from one another. Due to this spreading movement, the two blocking discs 17 are pressed against the housing seal seats 29 such that a sound sealing effect is achieved in the closed position of the slide gate valve 10.

Figure 3:
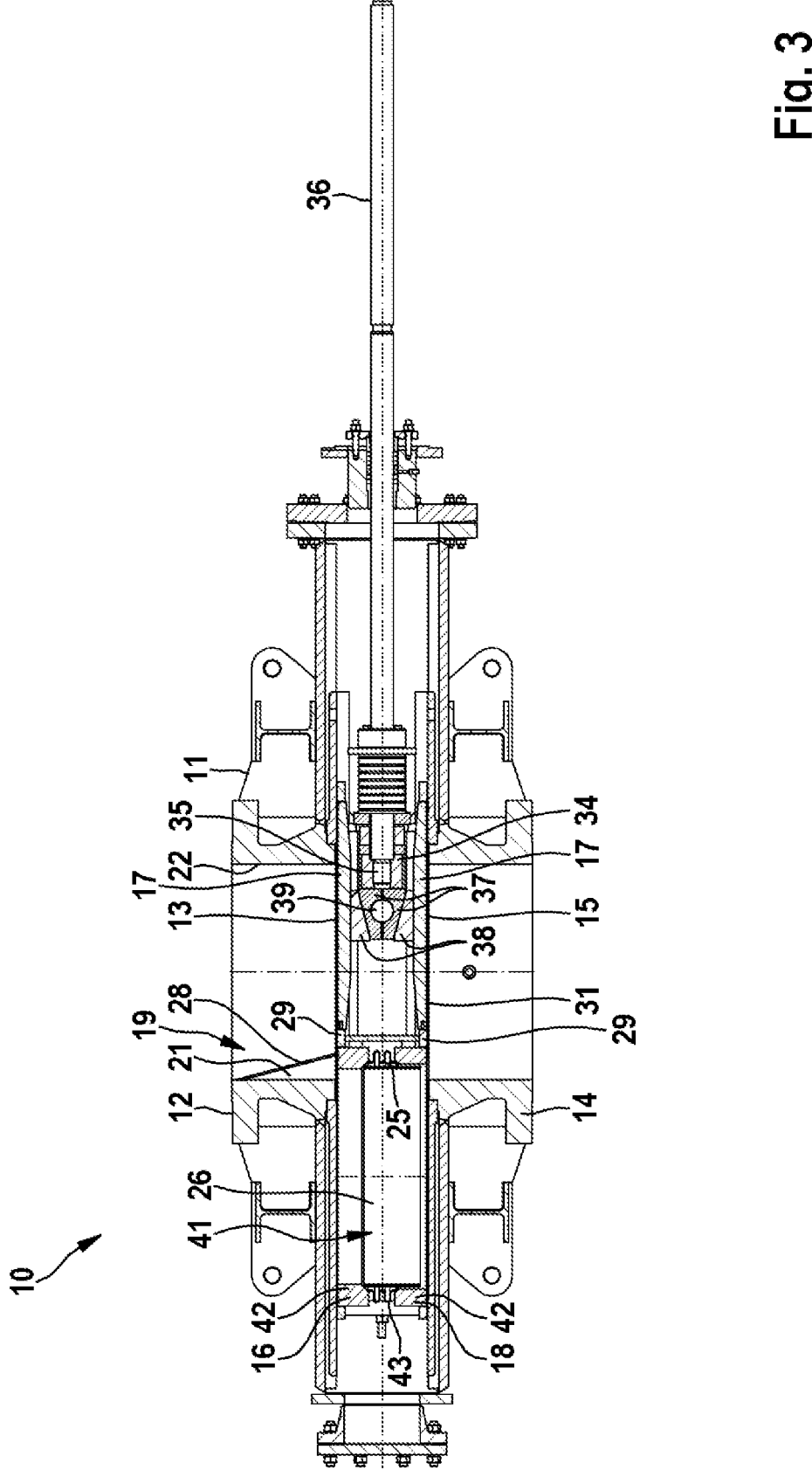
FIG. 3 shows a longitudinal section through the slide gate valve according to FIG. 1, wherein the blocking device of the slide gate valve is in a position, in which only the entry opening of the outlet port of the slide gate valve is connected to the passageway of the pipe bridge.
Figure 6:
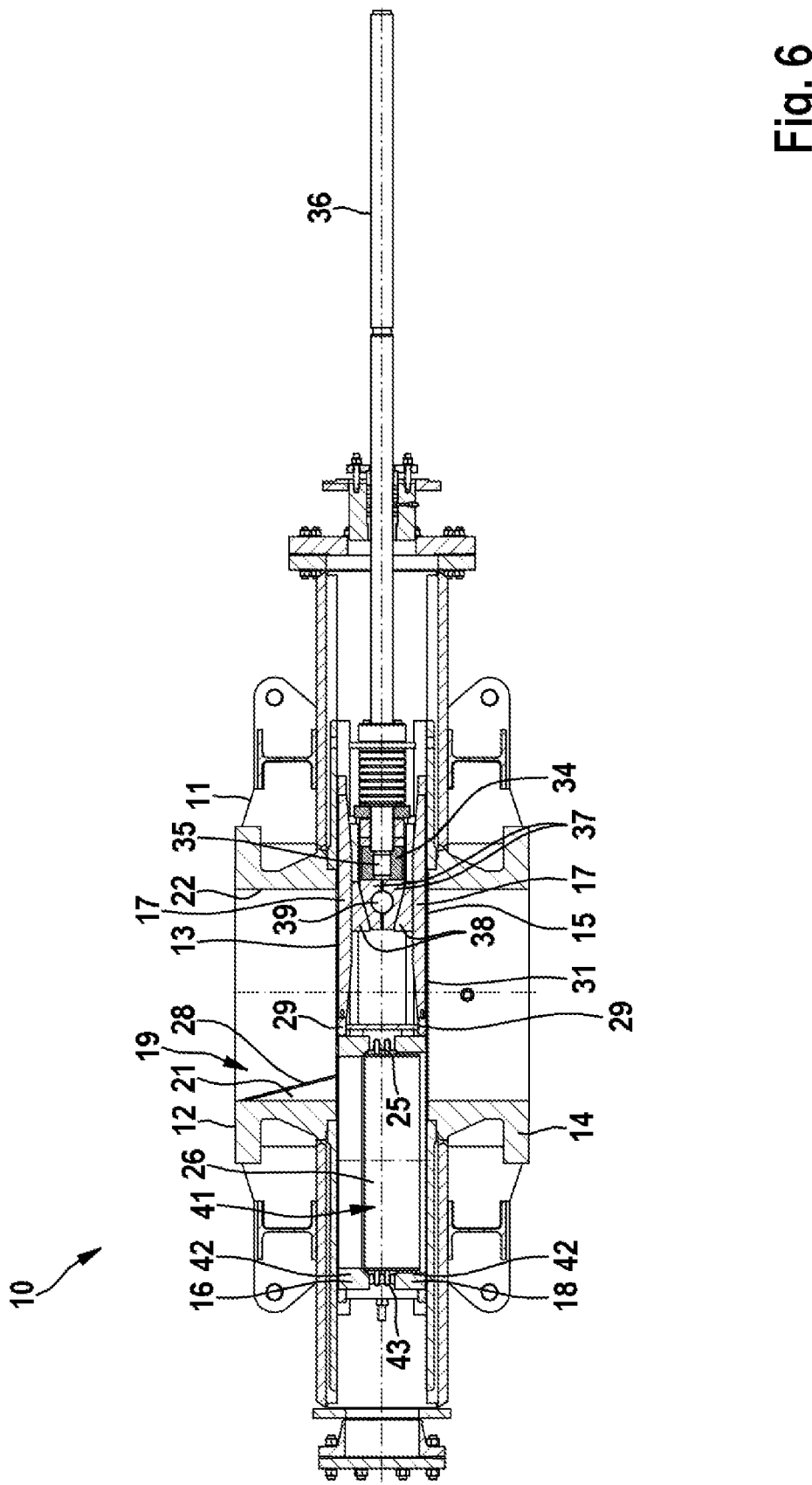
FIG. 6 shows a longitudinal section through the slide gate valve according to FIG. 1, wherein the blocking device of the slide gate valve is moved farther in the direction of the open position.

FIGS. 1, 3 and 6 show an opening process of the slide gate valve 10, during which the blocking device 16 is moved from the closed position into the open position. To this end, the blocking device 16 is arranged so as to be movable between the inlet and outlet ports 12, 14.

The slide gate valve 10 furthermore comprises a guiding device 19 for guiding an inflowing fluid flow. The guiding device 19 has a guiding element 21 that is arranged on an inner wall 22 of the inlet port 12. Viewed in the direction of displacement of the blocking device 16, the guiding element 21 is arranged on the inner wall 22 of the inlet port 12 on the side of the pipe bridge.

The inner wall 22 of the inlet port 22 is realized cylindrically. The inner wall 22 of the inlet port 12 has an inner circumference, on which the guiding element 21 abuts.

According to FIGS. 1, 3 and 6, the guiding element 21 extends in a longitudinal direction of the inlet port 12 and ends at the position of the exit opening 13 of the inlet port 12. The guiding element 21 approximately extends over the entire length of the inlet port 12. The guiding element 21 ascends toward the exit opening 13 of the inlet port 12. In other words, the guiding element 21 is designed such that it extends obliquely into the interior of the inlet port 12 toward the exit opening 13. The guiding element 21 is designed in a ramp-shaped manner toward the exit opening 13 of the inlet port 12. The guiding element 21 has a surface 28 that faces the interior of the inlet port 12. This surface is in contact with the fluid or a fluid flow during the operation of the slide gate valve. The surface 28 ends flush with the inner wall 22 of the inlet port 12. This is clearly visible in FIGS. 2 and 4. The surface 28 covers a region of the inner wall 22.

FIGS. 2, 4, 5 and 7 furthermore show that the surface 28 of the guiding element 21 is realized in a bulging manner. The guiding element 21 is hump-shaped due to the bulging surface 28. In other words, the guiding element 21 is a laminar element that extends over a region of the inner wall 22 of the inlet port 12. The surface 28 of the guiding element 21 specifically has a convex bulge, which extends into the interior of the inlet port 12, transverse to the longitudinal direction of the inlet port 12. The guiding element 21 is sectionally realized in a shell-shaped manner.

The guiding element 21 is made of sheet metal. In other words, the guiding element 21 is a guiding sheet. It is also possible to realize the guiding element 21 in the form of a guiding plate. A guiding plate has a greater wall thickness than a guiding sheet. Alternatively, the guiding element 21 may be made of a solid material that completely fills out a space between the surface 28 and the inner wall 22 of the inlet port 12.

The guiding element 21 ends in the longitudinal direction at the position of the exit opening 13 of the inlet port 12. At this position, the guiding element 21 has an outer contour 24 that corresponds to an inner contour 25 of the passageway 26 of the pipe bridge 18. The inner contour 25 and the outer contour 24 are arranged adjacent to one another in the longitudinal direction of the inlet port 12. The inlet port 12 has one of the two seal seats 29 at the position of the exit opening 13. Viewed along the common longitudinal axis, the outlet port 14 has the other of the two seal seats 29 at the position of the entry opening 15 opposite of the exit opening 13. Due to the shape of the outer contour 24, the guiding element 21 is offset inward relative to the seal seat 29 of the outlet port 14 and, in particular, the seal seat 29 of the inlet port 12 transverse to the longitudinal direction.

The outer contour 24 of the guiding element 21 forms an outer edge. The outer contour 24 of the inlet port 12 reflects the inner contour 25 of the passageway 26 of the pipe bridge 18. The inner contour 25 specifically is a circular, particularly perfectly circular, inner circumference of the passageway 26. The outer contour 24 of the guiding element 21 therefore is realized in the shape of a circular arc. The outer contour 24 of the guiding element 21 specifically forms a circular arc segment. The outer contour 24 of the inlet port 12 and the inner contour 24 of the passageway 26 of the pipe bridge 18 have the same curvature radius.

The outer contour 24 of the guiding element 21 ends on the inner wall with two ends, wherein an intermediate vertex is arranged in the exit opening 13 transverse to the longitudinal direction. The outer contour 24 of the guiding element 21 therefore is realized in a convexly bulging manner.

The guiding element 21 reduces the exit opening 13 of the inlet port 12 because the outer edge 21 of the guiding element 21 protrudes into the exit opening transverse to the longitudinal direction of the port 12. Due to the specially shaped outer contour 24 of the guiding element 21, which corresponds to the adjacent inner contour 25 of the pipe bridge 18, an opening cross section 23 of the exit opening 13 of the inlet port 12 is enlarged at the moment of the first flow ingress from the inlet port 12 into the passageway 26 of the pipe bridge 18 as the slide gate valve is opened.

Figure 4:
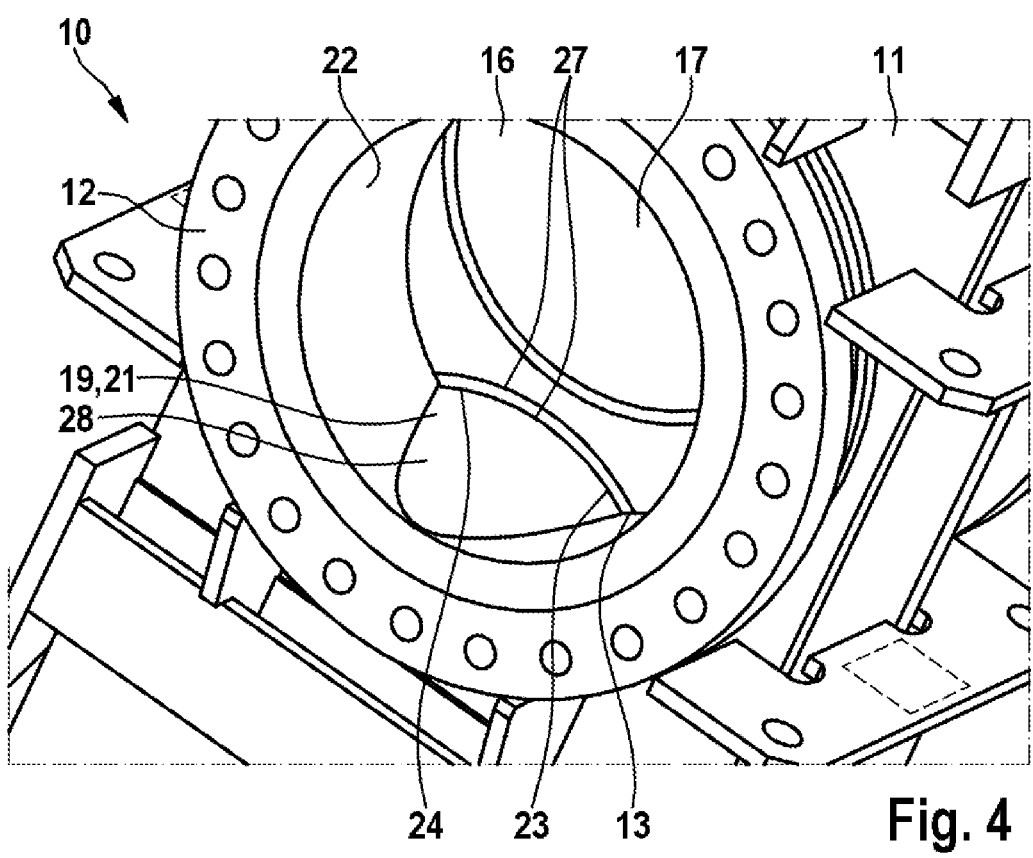
FIG. 4 shows a perspective detail of the inlet port and the guiding device of the slide gate valve according to FIG. 1, wherein an opening cross section of the exit opening of the inlet port is illustrated in the position according to FIG. 3.
Figure 5:
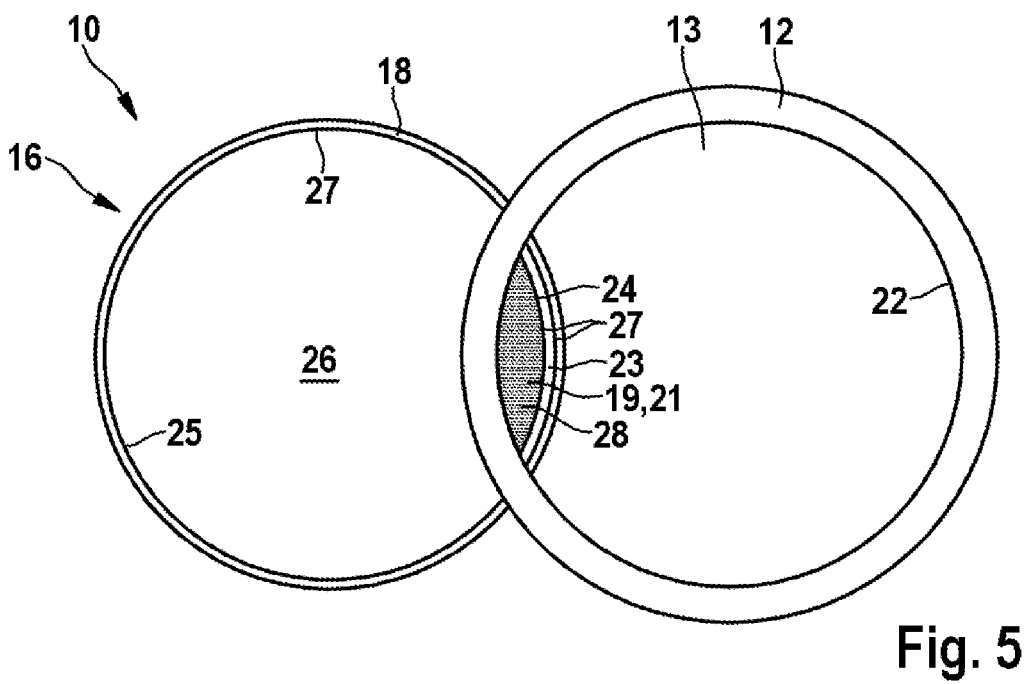
FIG. 5 shows a schematic representation for illustrating the opening cross section of the exit opening of the inlet port in the position according to FIG. 3, which shows the moment of the first flow ingress into the pipe bridge.

According to FIGS. 4 and 5, the guiding element 21 is realized in such a way that the opening cross section 23 of the exit opening 13 of the inlet port 12 has a cross-sectional shape that deviates from a punctiform cross section at the moment of the first flow ingress from the inlet port 12 into the pipe bridge 28. This corresponds, for example, to an enlarged opening cross section. The opening cross section 23 is linear at the moment of the first flow ingress from the inlet port 12 into the pipe bridge 18. The opening cross section can have a passage area with a greater extent than a punctiform opening at the moment of the first flow ingress from the inlet port into the passageway 26 of the pipe bridge 18. The opening cross section 23 forms a gap at the moment of the first flow ingress from the inlet port 12 into the passageway 26 of the pipe bridge 18. The gap is arcuate. In other words, the gap has an annular shape. The gap may alternatively or additionally be at least sectionally linear.

The opening cross section 23 of the exit opening 13 of the inlet port 12 is delimited by an inner circumference of the inner wall 22 of the inlet port 12, the outer contour 24 of the guiding element 21 and the inner contour 25 of the passageway 26 of the pipe bridge 18 at the moment of and during the entire opening process. In other words, the inner circumference of the inner wall 22 of the inlet port 12, the outer contour 24 of the guiding element 12 and the inner contour 25 of the passageway 26 of the pipe bridge 18 define the opening cross section 23 of the exit opening 13 of the inlet port 12 into the pipe bridge 18 when the slide gate valve is opened and closed.

The opening cross section 23 of the exit opening 13 of the inlet port 12 is always smaller than an opening cross section 31 of the entry opening 15 of the outlet port 14 as the slide gate valve 10 is opened and/or in the open position of the slide gate valve 10. This is illustrated as an example in FIG. 3.

The opening process of the slide gate valve 10 according to FIGS. 1 to 7 is described below.

When the blocking device 16 is displaced from the closed position into the open position of the slide gate valve 10, a linear, particularly gap-shaped, opening cross section 23 of the exit opening 13 of the inlet port 12 is unblocked at the moment of an initial or first ingress of a fluid flow into the passageway 26 of the pipe bridge 18, wherein said opening cross section is defined by the outer contour 24 of the guiding element 21 and the adjacent inner contour 25 of the passageway 26 of the pipe bridge 18. FIG. 1 shows the slide gate valve 10 in the closed position. FIG. 4 and FIG. 5 show the linear or gap-shaped opening cross section 23 at the moment of the first ingress of the fluid flow into the passageway 26 of the pipe bridge 18.

Figure 8:
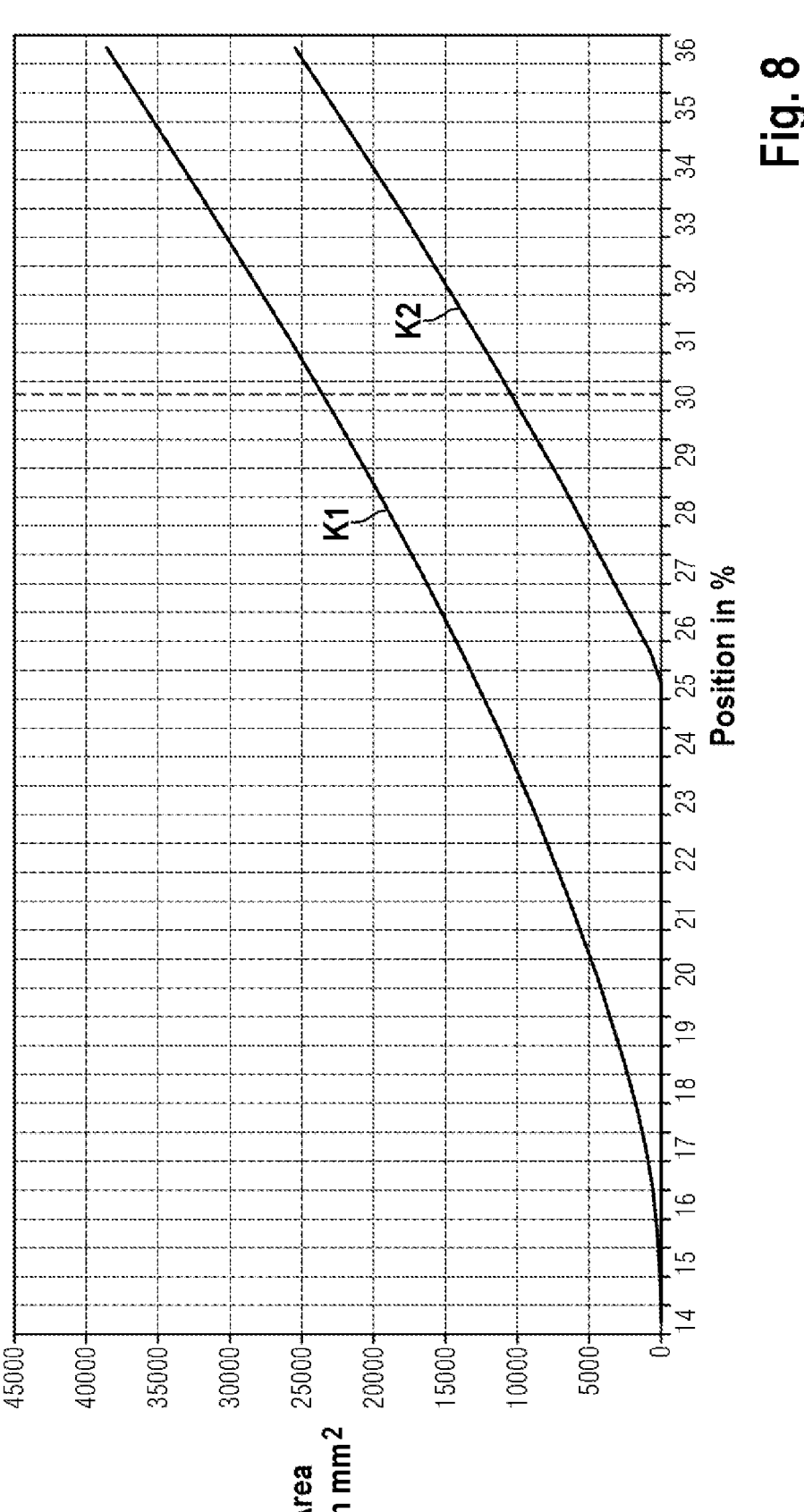
FIG. 8 shows a diagram for illustrating the opening phase of the exit opening of the inlet port of the slide gate valve according to FIG. 1.

Since the passage opening 23 is enlarged in comparison with a punctiform opening, the fluid containing particles flows into the passageway 26 of the pipe bridge 18 such that it is distributed over the opening cross section 23. In this way, the flow speed of the fluid flow is reduced in comparison with a punctiform opening. Furthermore, FIG. 3 and the diagram according to FIG. 8 clearly show that the guiding element 21 in the inlet port 12 causes the exit opening 13 to be unblocked in a delayed manner in relation to the entry opening 15 of the outlet port 14. In FIG. 8, the curve K1 represents the area of the opening cross section 32 of the entry opening 15 of the outlet port 14 as a function of the respective stroke position of the blocking device 16 or the slide rod 36. Furthermore, the curve K2 represents the area of the opening cross section 23 of the exit opening 13 of the inlet port 12 as a function of the respective stroke position of the blocking device 16 or the slide rod 36. This clearly shows that a passage opening from the passageway 26 into the outlet port 14 already exists at the moment of the first flow ingress. The fluid flow ingressing in a delayed manner therefore is quickly discharged through the opening cross section 31 of the entry opening 15 of the outlet port 15 without subjecting the seal seat 29 on the outlet port 14 to abrasive stress.

Figure 7:
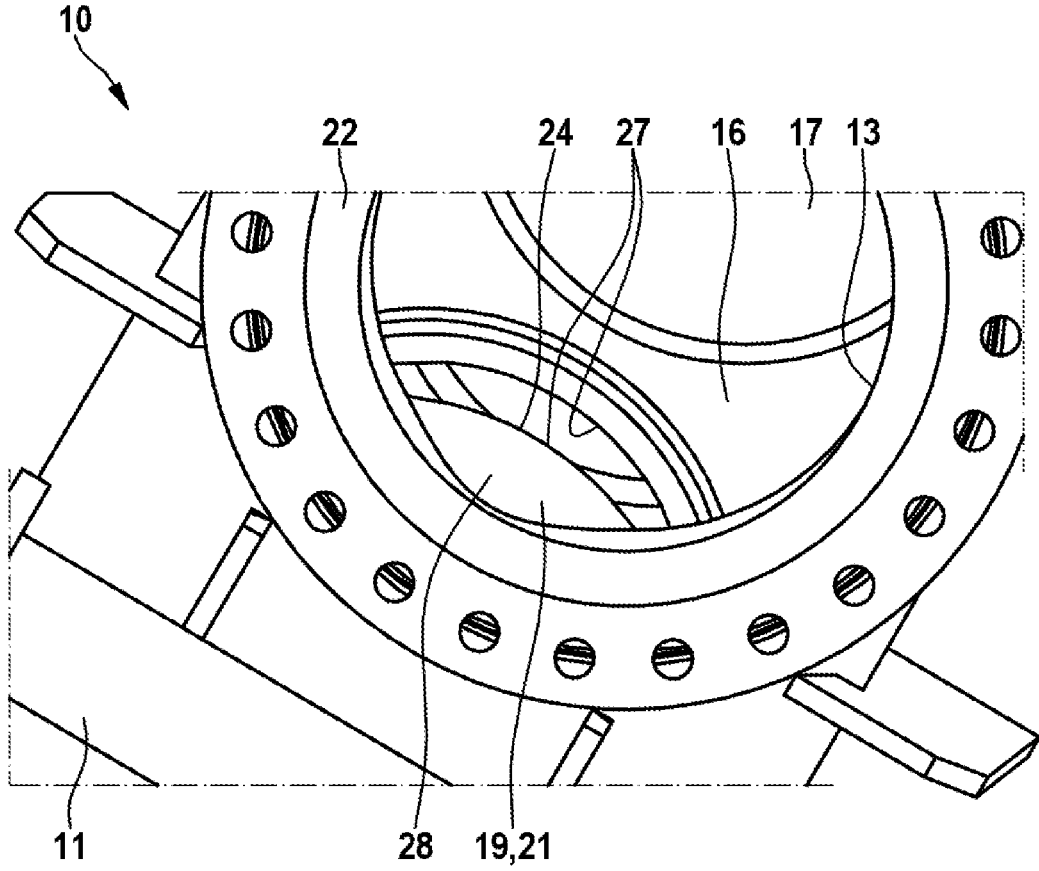
FIG. 7 shows a perspective detail of the inlet port and the guiding device of the slide gate valve according to FIG. 1, wherein the opening cross section of the exit opening of the inlet port is additionally enlarged.

As an example, FIGS. 6 and 7 show the further opening process of the slide gate valve 10, during which the opening cross section 23 is unblocked continuously, particularly uniformly.

The displacement path between the open position and the closed position, over which the blocking device 16 is displaced, e.g. during an opening process, corresponds to a total stroke of the blocking device 16, particularly the slide rod 36. In the closed position, the blocking device 16 is arranged at a minimal stroke position whereas the blocking device 16 is in the open position arranged at a maximal stroke position. In other words, the blocking device 16 has in the closed position a stroke of 0 percent of the total stroke and in the open position a stroke of 100 percent of the total stroke.

The stroke range, in which the opening cross section 23 of the exit opening 13 of the inlet port 12 influences an applied process pressure, may lie between 0 percent and up to 35 percent of the total stroke. This stroke range corresponds to the opening phase of the slide gate valve 10. The opening phase, which includes the moment of the first flow ingress into the pipe bridge 18 through the exit opening 13 of the inlet port 12, may take place at a stroke of the blocking device 16 that lies between 22 percent and 35 percent, particularly between 22 percent and 30 percent, of the total stroke. The moment of the first flow ingress into the pipe bridge 18 through the exit opening 13 of the inlet port 12 preferably occurs at a stroke of the blocking device 16 that lies between 23 percent and 28 percent, particularly between 24 percent and 26 percent, of the total stroke. It is particularly preferred that the moment of the first flow ingress into the pipe bridge 18 through the exit opening 13 of the inlet port 12 occurs at a stroke of 25 percent of the total stroke.

Figure 9:
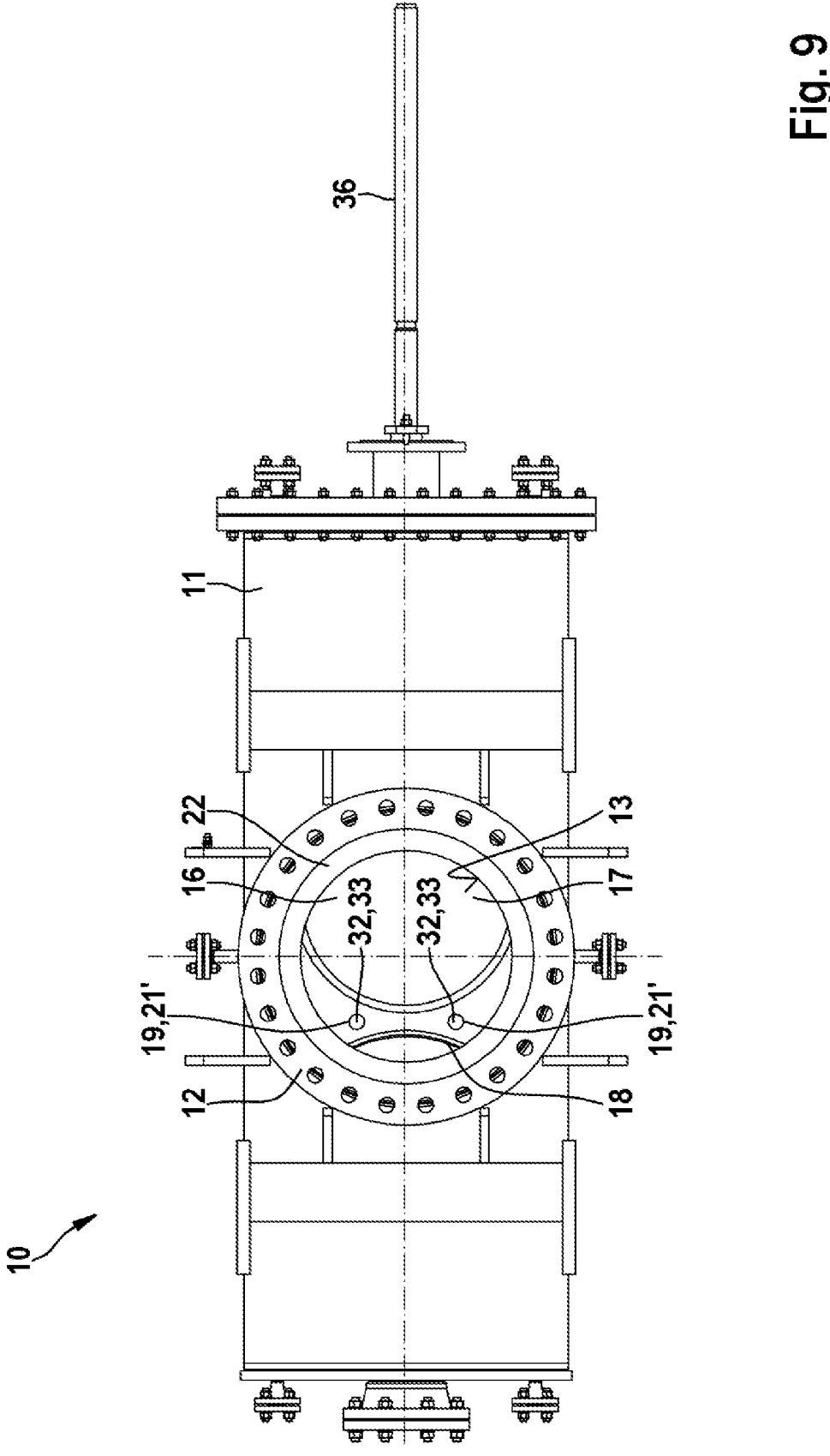
FIG. 9 shows a top view of a slide gate valve according to another exemplary embodiment of the invention.
Figure 10:
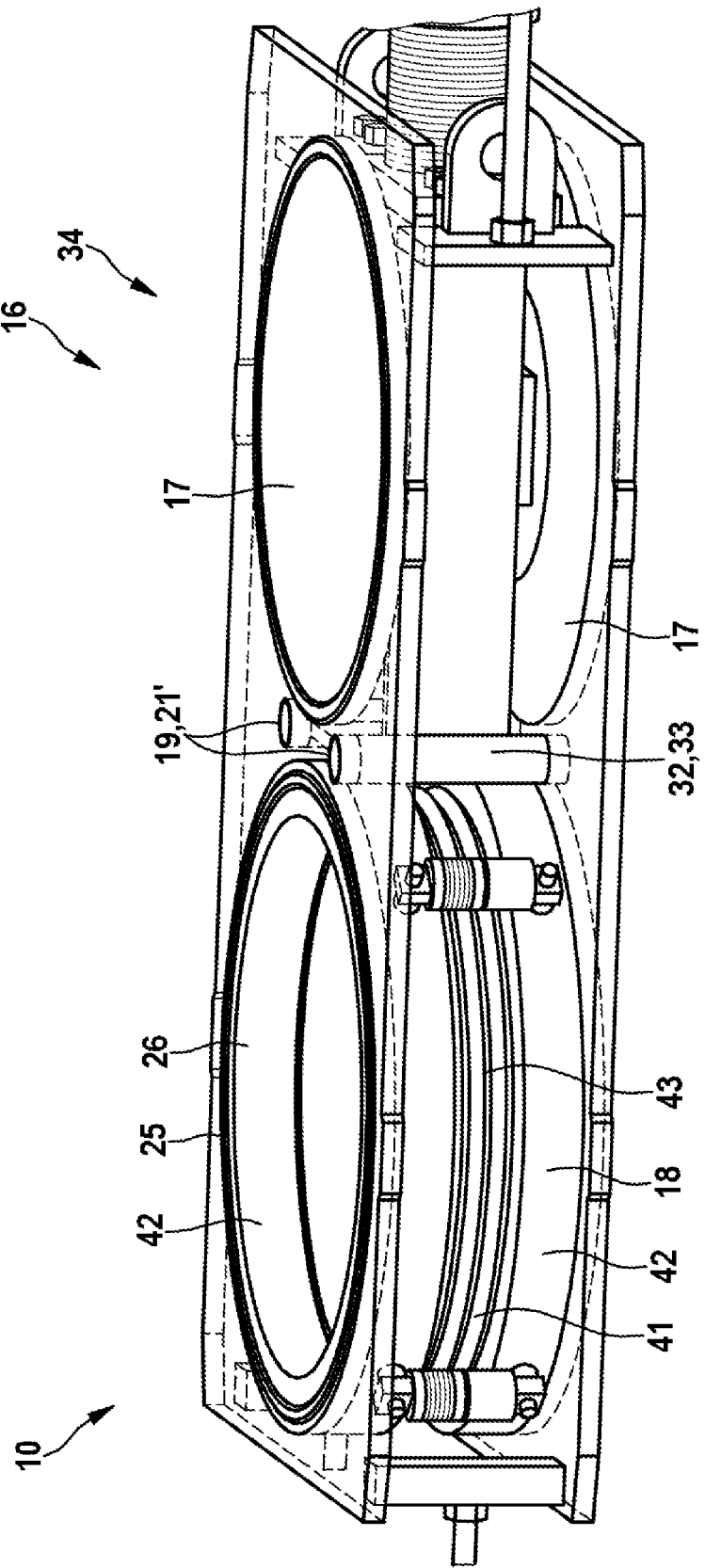
FIG. 10 shows a perspective and partially transparent view of a blocking device of the slide gate valve according to FIG. 9.

FIGS. 9 and 10 show another exemplary embodiment of a slide gate valve 10 according to the invention, which differs from the slide gate valve 10 according to FIGS. 1 to 7 with respect to the guiding device 19 for guiding the flow, specifically with respect to the guiding element and the blocking device 16. Only the distinctive characteristics of the slide gate valve 10 according to FIGS. 9 and 10 are described below. All undescribed characteristics of the slide gate valve 10 according to FIGS. 9 and 10 are identical to those of the slide gate valve 10 according to FIGS. 1 to 7.

The slide gate valve 10 has multiple guiding elements 21' that are arranged between the two blocking discs 17 and the pipe bridge 18 in a direction of displacement of the blocking device 16. The guiding elements 21' respectively form a flow channel 32 that extends transverse to the direction of displacement and connects the inlet port 12 to the outlet port 14 at least when the slide gate valve 10 is opened. The respective flow channel 32 penetrates the blocking device 16 transverse to the direction of displacement of the blocking device 16. In other words, the respective flow channel 32 extends in the longitudinal direction of the inlet and outlet ports 12, 14. According to FIGS. 9 and 10, the slide gate valve 10 has a total of two guiding elements 21' that respectively form a flow channel 32.

The guiding elements 21 are realized in a tubular manner. The guiding elements 21' specifically are formed by pipe sections that are integrated into the blocking device 16. The guiding elements 21' may alternatively be formed by special section tubes. The guiding elements 21' extend parallel to one another through the blocking device 16. The guiding elements 21' are arranged between the blocking discs 17 and the pipe bridge 18 so as to lie on a common plane.

FIG. 10 shows that the guiding elements 21' are arranged in a disc basket 34. This means that the guiding elements 21' are moved together with the blocking device 16 during a movement of the blocking device 16 between the open and closed position and vice versa. This has the advantage that, during an opening process of the slide gate valve 10, a fluidic connection between the inlet and outlet ports 12, 14 is produced before an opening cross section 23 of the exit opening 13 of the inlet port 12 into the passageway 26 of the pipe bridge 18 is unblocked. This means that the fluid pressure on the inlet side is already reduced in advance and the dirt deposited on the inlet side is transported to the outlet port 14 through the flow channels. The guiding elements 21' form bypass channels around the passageway 26 of the pipe bridge 18, wherein said bypass channels divert the fluid flow from the inlet port 12 into the outlet port 14 during an opening process before the passage into the passageway 26 of the pipe bridge 18 is unblocked (see FIG. 9). In this way, the fluid flow through the passageway 26 of the pipe bridge 18 contains fewer particles such that the housing seal seat 29 on the outlet side is protected.

The embodiment according to FIGS. 11 to 17 only differs from the exemplary embodiment according to FIGS. 1 to 7 with respect to the shape of the guiding element 21, as well as a few design details of the guiding element 21. All designs described in connection with the exemplary embodiment according to FIGS. 1 to 7 therefore can be transferred to the exemplary embodiment according to FIGS. 11 to 17 and are disclosed and claimed in connection with the exemplary embodiment according to FIGS. 11 to 17.

In addition, the combination of the exemplary embodiments according to FIGS. 9, 10 and 11 to 17 is disclosed and claimed.

Figure 11:
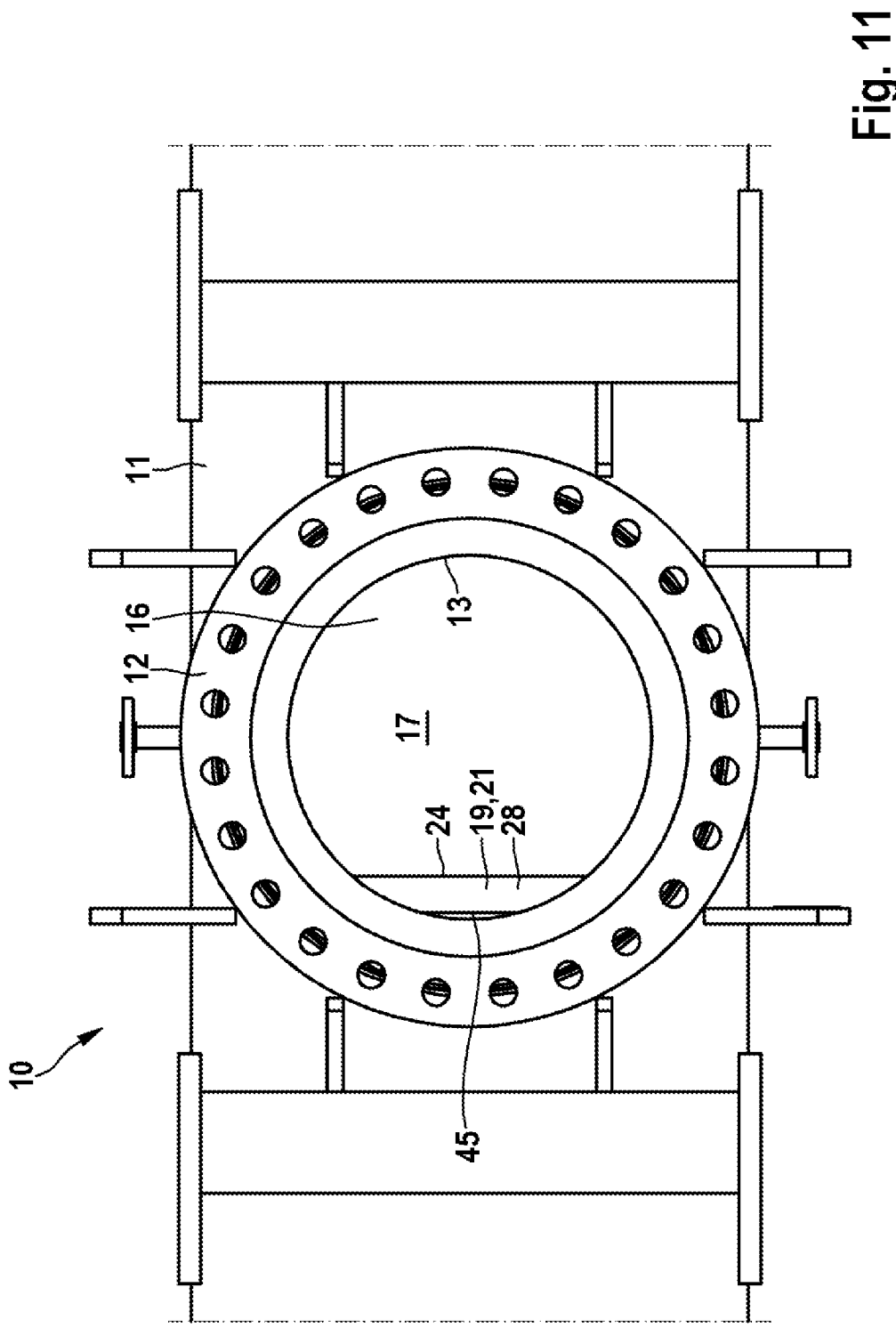
FIG. 11 shows a top view of a slide gate valve in the region of the inlet port according to another exemplary embodiment of the invention, in which the guiding element has a straight outer edge.
Figure 12:
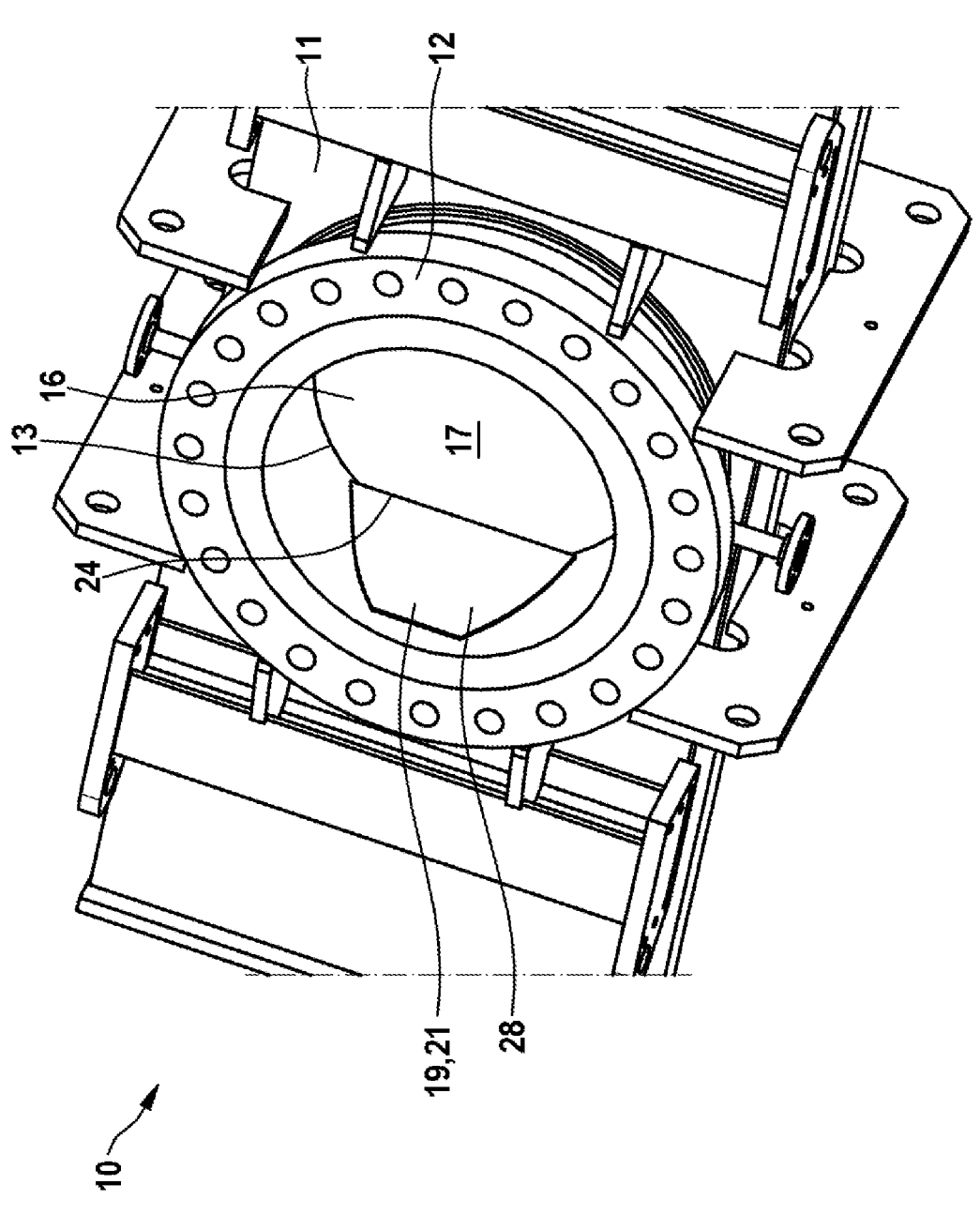
FIG. 12 shows a perspective view of the slide gate valve according to FIG. 11 in the region of the inlet port.

According to FIGS. 11 and 12, the slide gate valve 10 has a valve housing 11 with an inlet port 12. The inlet port 12 delimits an exit opening 13 that is aligned with the entry opening 15 of the corresponding outlet port 14.

A blocking device 16 comprising blocking discs 17 and a pipe bridge 18 is provided for actuating the slide gate valve 10. With respect to details regarding the blocking device 16, we refer to the explanations in connection with the exemplary embodiment according to FIGS. 1 to 7.

The inlet port 12 has a guiding device 19 with a guiding element 21 on the side of the pipe bridge.

The difference in relation to the guiding element 21 according to FIGS. 1 to 7 can be seen in that the outer contour 24 of the guiding element 21 according to FIGS. 11 to 15 forms a straight outer edge. It was determined that the flow conditions in the initial phase of the opening process of the slide gate valve 10 are improved by the straight outer edge.

The geometry of the guiding element 21 is described in greater detail as follows. According to FIG. 12, the straight outer edge practically extends on the same plane as the circumferential delimitation of the exit opening 13. The straight outer edge essentially extends perpendicular to the opening and closing direction of the blocking device 16. This is also quite evident in the schematic representation according to FIG. 15.

The surface 28 of the guiding element 21 is likewise straight, i.e. not curved.

The guiding element 21 protrudes into the interior of the inlet port 12 similar to the exemplary embodiment according to FIGS. 1 to 7. In this case, the surface 28 is arranged in an inclined manner referred to the inner wall of the inlet port 12. The distance between the surface 28 and the inner wall of the inlet port 12 increases continuously in the flow direction, i.e. in the direction of the exit opening 13. The distance of the surface 28 from the inner wall of the inlet port 12 is maximal at the straight outer edge. This shape of the guiding element 21 is clearly visible in the cross section according to FIG. 13.

FIG. 12 furthermore shows that the outer contour 24 of the guiding element 21, specifically the straight outer edge, practically lies at the same height as the exit opening 13. A slight gap between the blocking disc 17 and the outer edge is possible as long as the exit opening 13 is shielded by the guiding element 21 in such a way that a fluid flow is at least largely prevented in the initial phase of the opening process of the slide gate valve 10.

Figure 14:
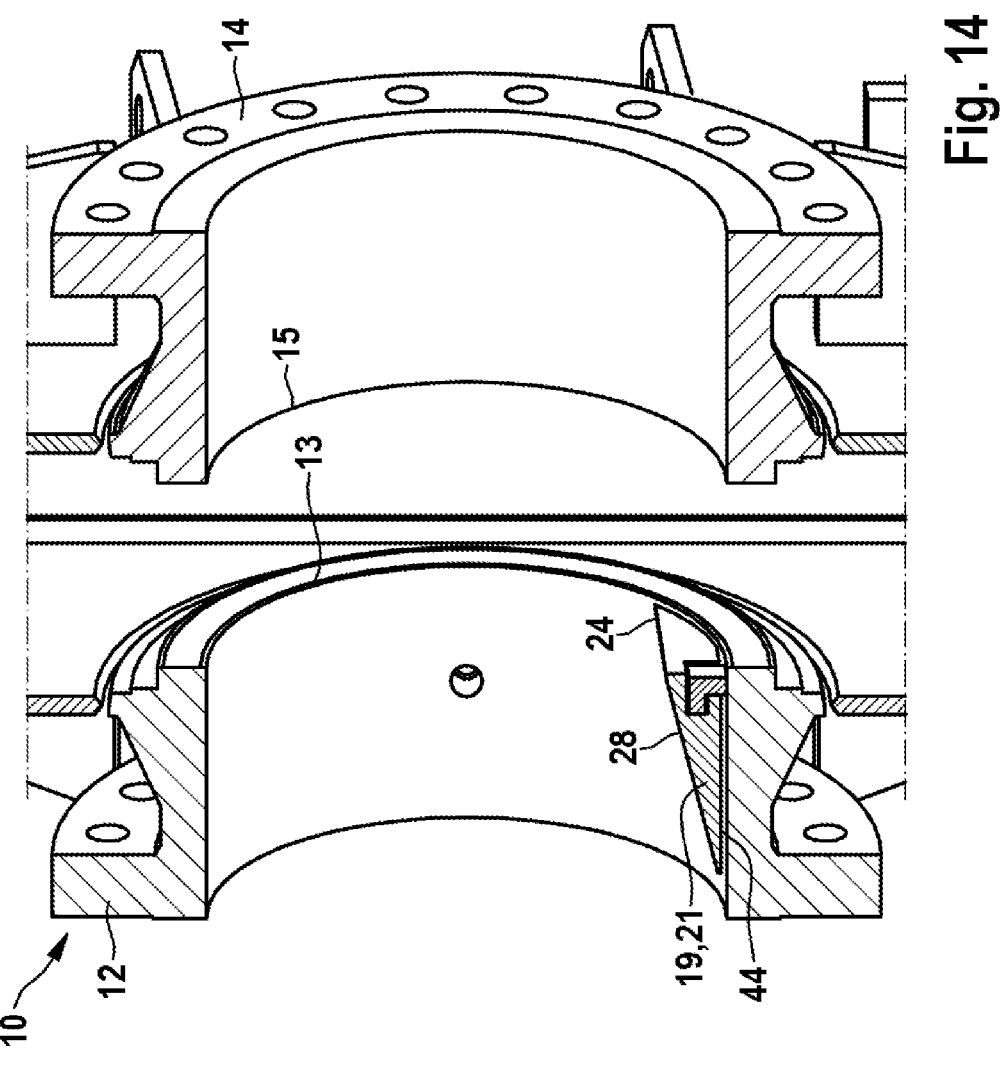
FIG. 14 shows a perspective view of the sectioned inlet port according to FIG. 13 and the associated sectioned outlet port.
Figure 13:
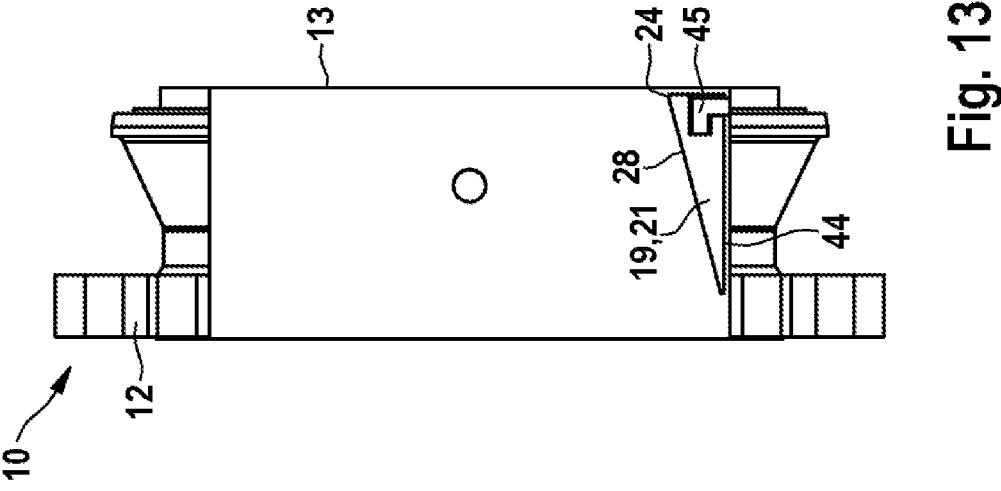
FIG. 13 shows a section through the inlet port of the slide gate valve according to FIG. 11.

FIGS. 13 and 14 show the triangular cross section of the guiding element 21. The guiding element 21 is made of solid material, i.e. realized massively, in the example according to FIGS. 13 and 14. The guiding element 21 may alternatively comprise a metal sheet that is connected to the inner wall of the inlet port 12. In this case, the triangular cross section is formed by the inner wall of the inlet port 12 and the guiding sheet. The surface 28 is straight. The triangular cross section of the guiding element 21 therefore extends over its entire width. The surface 28 has the same inclination at all locations.

FIGS. 13 and 14 show a drainage gap 24 that extends between the rear side of the guiding element 21, i.e. the side facing away from the surface 28, and the inner wall of the inlet port 12. Liquid such as condensate can drain off through the drainage gap 24.

A fastening means 45, e.g. in the form of a cam, is provided for fastening the guiding element 21 in the inlet port 12, wherein said fastening means connects the guiding element to the inlet port 12 permanently or separably. For example, the guiding element 21 may be welded into the inlet port. The cam is designed in the shape of a hook such that the guiding element 21 can be attached thereto with a corresponding receptacle opening. Other cam shapes are possible. For example, the cam may be designed straight for smaller nominal widths.

The surface 28 is realized in a wear-resistant manner. To this end, it would be possible, for example, to provide a hard facing on the surface 28 by means of buildup welding.

The above-described details such as the drainage gap 44, the fastening means 45 and the hard facing are also disclosed and claimed in connection with the guiding element according to FIGS. 1 to 7.

Figure 15:
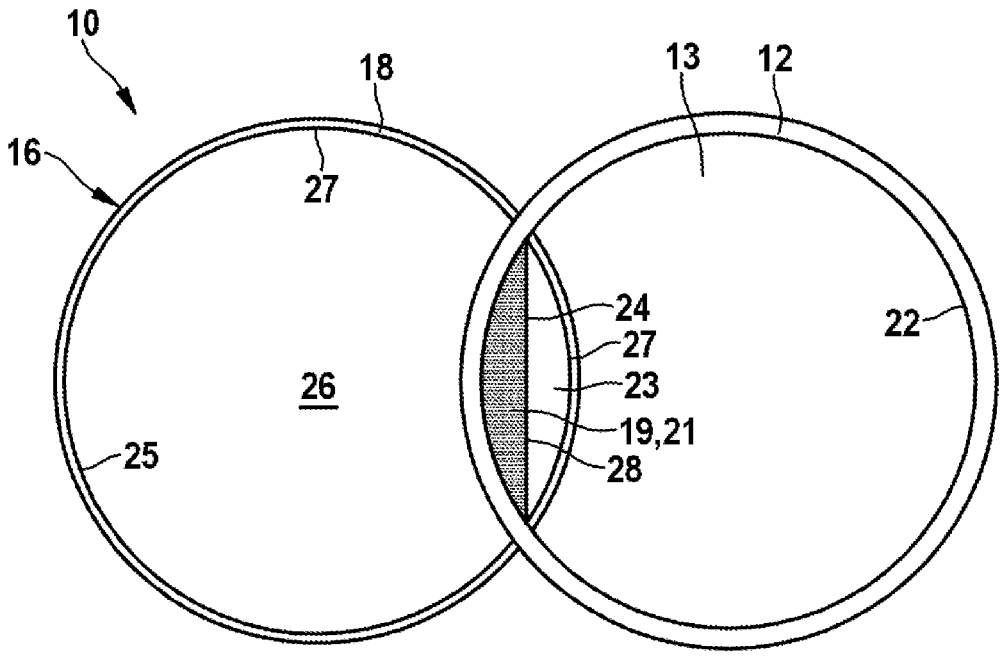
FIG. 15 shows a schematic representation for illustrating the opening cross section of the exit opening of the inlet port according to FIG. 11 in a position at the moment of the first flow ingress into the pipe bridge.

FIG. 15 shows the shape of the opening cross section 23 in the initial phase of the opening process, namely when the fluidic connection between the inlet port 12 and the outlet port 14 is produced and a partial region of the passage opening 26 of the pipe bridge 18 is unblocked. According to FIG. 15, the opening cross section 23 has a combined linear and arcuate shape. The opening cross section 23 is realized in the form of a gap with the shape of a segment of a circle. The straight side of the opening cross section 23 (chord) is delimited by the straight outer edge of the outer contour 24. The arcuate side (arc) of the opening cross section 23 is defined by the curvature radius 27 of the pipe bridge 18.

Analogous to the exemplary embodiment according to FIGS. 1 to 7, unblocking of the exit opening 13 is delayed by the guiding element 21 to such an extent that the entry opening 15 of the outlet port 14 is opened to a greater degree than the exit opening 13 of the inlet port 12 before the flow begins to pass through. In addition, the opening cross section is enlarged in comparison with the prior art by the straight outer edge such that the undesirable nozzle effect is reduced in the initial phase of the opening process.

In this exemplary embodiment, a small opening is in fact formed for a short time during the movement of the inner wall of the disc basket 18 past the straight outer edge. As the movement past the straight outer edge continues, however, the opening cross section widens so quickly that a sufficiently large opening cross section is made available and the undesirable nozzle effect practically is suppressed. In addition, the entry opening 15 of the outlet port 14 already is opened relatively wide before the exit opening 13 of the inlet port 12 is opened such that the fluid ingressing into the pipe bridge 18 is immediately discharged and cannot accumulate in the pipe bridge 18.

In the initial phase of the opening process of a slide gate valve constructed in accordance with the prior art, i.e. without the invention, the particle flow behaves in such a way that particles accumulate in the pipe bridge during the opening process and relatively few particles enter the outlet port 14 from the pipe bridge 18 with high speed. In contrast, fewer particles are admitted into the pipe bridge 18 if a guiding element 21 according to FIGS. 11 to 15 is provided and shields the exit opening 13 of the inlet port 12 in the initial phase. The particle flow can pass through the entry opening 15, which is opened to a greater degree than the exit opening 13, in a nearly unobstructed manner.

The same phenomenon can be observed in the fluid flow that backs up significantly in the pipe bridge in a slide gate valve without the invention. Due to the delayed unblocking of the entry opening 13 achieved in the exemplary embodiment of the invention and the resulting flow cross sections of different sizes, the fluid flow can also pass through the blocking device 16 being opened in a nearly unobstructed manner in the initial phase of the opening process.

In conclusion, it should be noted that the characteristics of the two described exemplary embodiments are not limited to the individual exemplary embodiments, but rather can be freely combined with one another.

LIST OF REFERENCE SYMBOLS

10 Slide gate valve
11 Valve housing
12 Inlet port
13 Exit opening
14 Outlet port
15 Entry opening
16 Blocking device
17 Blocking disc
18 Pipe bridge
19 Guiding device
21 Guiding element
21' Additional guiding element
22 Inner wall
23 Opening cross section of exit opening of inlet port
24 Outer contour
25 Inner contour
26 Passage
27 Curvature radius
28 Surface
29 Seal seat
31 Opening cross section of entry opening of outlet port
32 Flow channel
33 Pipe section
34 Disc basket
35 Spreading member
36 Slide rod
37 Inner wedge
38 Outer wedge
39 Centering ball
41 Compensator unit
42 Sealing rings
43 Bellows
44 Drainage gap
45 Fastening means (cam)

The invention claimed is:

1. A slide gate valve for chemical and/or petrochemical industrial plants comprising:
   a valve housing having an inlet port with an exit opening and an outlet port with an entry opening, which correspond with one another in an open position of the slide gate valve;
   a blocking device with at least one blocking disc and a pipe bridge that is arranged so as to be movable between the inlet port and the outlet port in order to open and close the slide gate valve; and
   at least one guiding device for guiding a flow, wherein the guiding device has at least one guiding element that is arranged on an inner wall of the inlet port and reduces the exit opening of the inlet port in such a way that, as the slide gate valve is opened, an opening cross section of the exit opening is enlarged at a moment of an initial flow ingress into the pipe bridge, wherein the guide element has at least one outer contour at the outlet opening of the inlet nozzle, which extends transversely to the opening and closing direction of the plate slide valve, wherein the outer contour of the guide element is arranged so close to the plane spanned by the outlet opening of the inlet connection that the guide element at least temporarily shields the outlet opening against the passage of the fluid flow when the plate valve is opened, wherein the outer contour of the guide element and the pipe bridge have the same radii of curvature to form a linear opening cross-section, or the outer contour of the guide element is straight to form a circular segment-shaped opening cross-section.

2. The slide gate valve according to claim 1, wherein the guiding element is designed in such a way that the exit opening of the inlet port can be unblocked or is unblocked in a delayed manner in relation to the entry opening of the exit port as the slide gate valve is opened.

3. The slide gate valve according to claim 1, wherein the guiding element is adapted in such a way that the opening cross section forms at least one gap between the pipe bridge and the inlet port at the moment of the initial flow ingress from the inlet port into the pipe bridge.

4. The slide gate valve according to claim 3, wherein the guiding element is adapted in such a way that the gap is sectionally arcuate and sectionally linear.

5. The slide gate valve according to claim 1, wherein the guiding element has a surface that is straight and protrudes into the inlet port with increasing distance from the inner wall along a flow direction or bulges into an interior of the inlet port starting from the inner wall.

6. The slide gate valve according to claim 1, wherein the guiding element has a triangular cross section or forms a triangular cross section together with the inner wall.

7. The slide gate valve according to claim 6, wherein the triangular cross section extends along a width of the guiding element.

8. The slide gate valve according to claim 1, wherein a drainage gap is formed between the guiding element and the inner wall.

9. The slide gate valve according to claim 1, wherein the at least one outer contour extends inward transverse to a longitudinal direction of the inlet port starting from the inner wall.

10. The slide gate valve according to claim 1, wherein the guiding element is designed so as to ascend in a flow direction toward the exit opening of the inlet port.

11. The slide gate valve according to claim 1, wherein the guiding element at least partially extends in a longitudinal direction of the inlet port and ends at the exit opening of the inlet port.

12. The slide gate valve according to claim 1, wherein the inlet port and the outlet port respectively have a seal seat for the at least one blocking disc, wherein the guiding element is at least sectionally offset inward in relation to the seal seat of the outlet port transverse to a longitudinal direction.

13. The slide gate valve according to claim 1, wherein an opening cross section of the entry opening of the outlet port is larger than the opening cross section of the exit opening of the inlet port as the slide gate valve is opened and/or in the open position of the slide gate valve.

14. The slide gate valve according to claim 1, wherein the at least one guiding device has an additional guiding element that is arranged between the at least one blocking disc and the pipe bridge in a direction of displacement of the blocking device, wherein the additional guiding element forms a flow channel that extends transverse to the direction of displacement and connects the inlet port to the outlet port at least when the slide gate valve is opened.

15. A method for operating the slide gate valve according to claim 1, wherein the pipe bridge has a passageway, which in the open position is arranged in such a way that the inlet port with the exit opening and the outlet port with the entry opening are connected to one another by the passageway of the pipe bridge, wherein the blocking device is in a closed position arranged in such a way that the inlet port and the outlet port are blocked off from one another by the at least one blocking disc.

16. The method according to claim 15, wherein the opening cross section of the exit opening of the inlet port is unblocked linearly over an entire displacement path of the blocking device as the slide gate valve is opened.

17. The use of the slide gate valve according to claim 1 in a coking process and/or cracking process.

* * * * *